United States Patent
Takemura et al.

(10) Patent No.: US 9,268,924 B2
(45) Date of Patent: Feb. 23, 2016

(54) TRANSMISSION APPARATUS, ELECTRONIC APPLIANCE, RECEPTION APPARATUS, AND AUTHENTICATION SYSTEM

(71) Applicant: Sony Corporation, Tokyo (JP)

(72) Inventors: Kazuyoshi Takemura, Tokyo (JP); Kuniya Hayashi, Tokyo (JP); Takanori Washiro, Kanagawa (JP); Isao Soma, Saitama (JP); Kayoko Tanaka, Tokyo (JP); Yoichiro Sako, Tokyo (JP); Kazutoshi Serita, Tokyo (JP); Satoshi Higano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/760,776

(22) Filed: Feb. 6, 2013

(65) Prior Publication Data
US 2013/0212643 A1    Aug. 15, 2013

(30) Foreign Application Priority Data
Feb. 13, 2012    (JP) .................................. 2012-028647

(51) Int. Cl.
| | |
|---|---|
| H04L 29/00 | (2006.01) |
| G06F 21/31 | (2013.01) |
| H02J 1/00 | (2006.01) |
| H04B 5/00 | (2006.01) |
| G06F 21/32 | (2013.01) |

(52) U.S. Cl.
CPC .............. *G06F 21/31* (2013.01); *G06F 21/32* (2013.01); *H02J 1/00* (2013.01); *H04B 5/0037* (2013.01); *H04B 5/0056* (2013.01)

(58) Field of Classification Search
CPC ......... H04L 27/00; H04L 27/01; G06F 15/16; G06F 15/177
See application file for complete search history.

(56) References Cited

U.S. PATENT DOCUMENTS

| | | | |
|---|---|---|---|
| 8,471,904 B2* | 6/2013 | Clemens ..................... 348/143 |
| 2007/0220088 A1* | 9/2007 | Choi et al. .................... 709/203 |
| 2013/0188679 A1* | 7/2013 | LI et al. ....................... 375/229 |
| 2013/0210249 A1 | 8/2013 | Takemura et al. |
| 2013/0210250 A1 | 8/2013 | Takemura et al. |
| 2013/0211606 A1 | 8/2013 | Takemura et al. |
| 2013/0211607 A1 | 8/2013 | Takemura et al. |

FOREIGN PATENT DOCUMENTS

JP    2003-110471 A    4/2003

* cited by examiner

*Primary Examiner* — Jeffrey Pwu
*Assistant Examiner* — Michael D Anderson
(74) *Attorney, Agent, or Firm* — Sony Corporation

(57) ABSTRACT

There is provided a transmission apparatus including a terminal electrically connected to a terminal of another apparatus, a body information acquiring unit acquiring body information of a user holding the transmission apparatus, and a transmission unit operable, by carrying out load modulation in accordance with the terminal contacting or being positioned close to the terminal of the other apparatus, to transmit, via the terminal, information on which the body information acquired by the body information acquiring unit is superimposed.

18 Claims, 11 Drawing Sheets

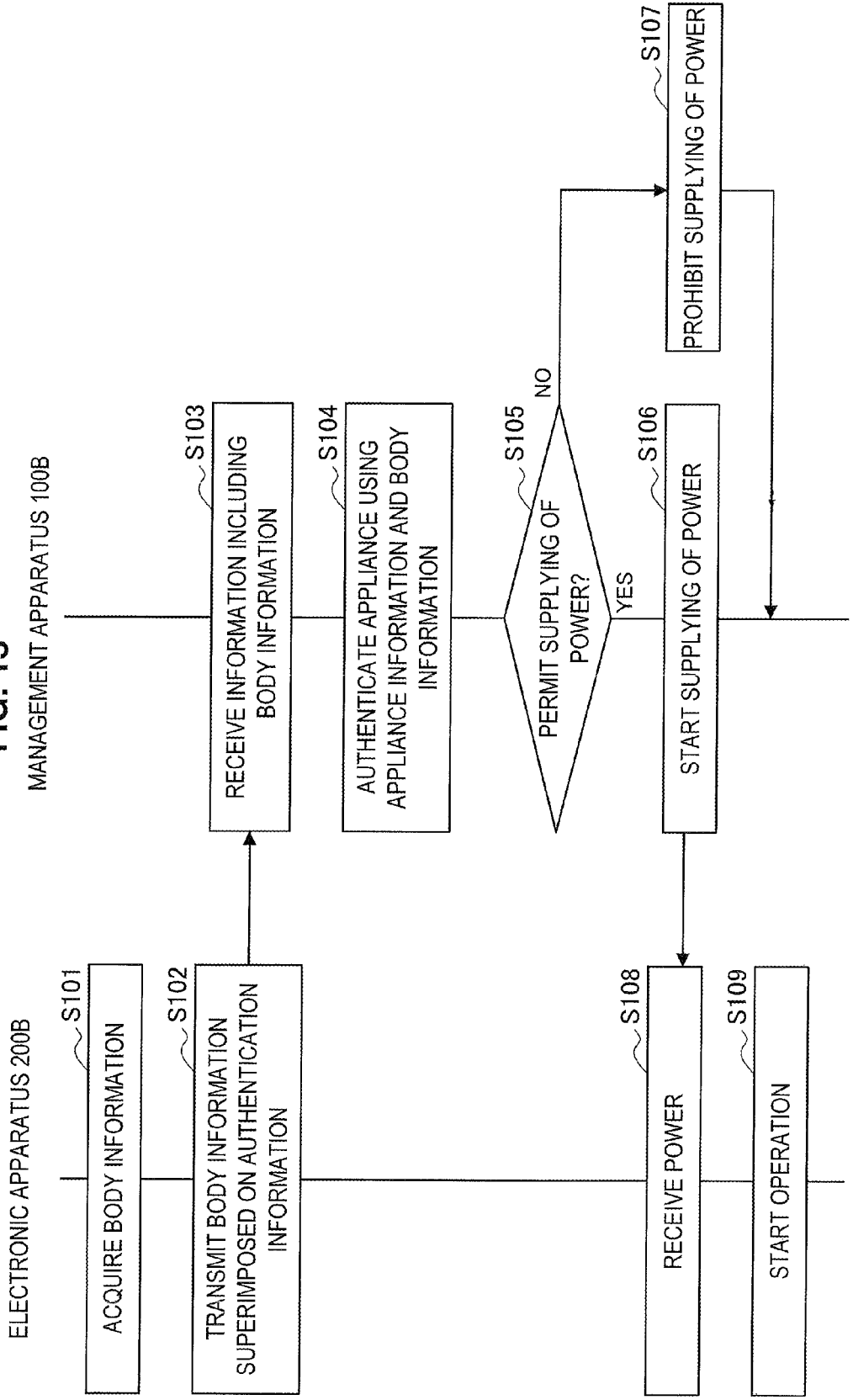

TRANSMISSION APPARATUS, ELECTRONIC APPLIANCE, RECEPTION APPARATUS, AND AUTHENTICATION SYSTEM

BACKGROUND

The present disclosure relates to a transmission apparatus, an electronic appliance, a reception apparatus, and an authentication system.

In response to growing environmental concerns in recent years, a number of management apparatuses, such as so-called "intelligent power strips" and "smart power strips", that control the supplying of power to electronic apparatuses connected by power lines have been introduced. Such control may include the selective stopping of supply to apparatuses that do not have to be provided with power. As one example, such management apparatuses use a technology called PLC (Power Line Communication) that uses power lines as communication lines. One example of a technology that carries out communication via power lines using PLC is disclosed in Japanese Laid-Open Patent Publication No. 2003-110471. Other technologies for carrying out wired communication with electronic apparatuses connected using power lines are also being developed.

SUMMARY

Although it has been possible with existing communication conducted via power lines to authenticate an appliance that receives power, there has been no technology for authenticating a user himself/herself who uses such appliance. Therefore, in the future, there will also be demand for a technology that uses communication conducted via power lines to authenticate a user who uses an appliance receiving supplied power.

The present disclosure aims to provide a novel and improved transmission apparatus, electronic appliance, reception apparatus, and authentication system capable of using communication conducted via power lines to easily receive user information on a user who uses an appliance receiving supplied power.

According to an embodiment of the present disclosure, there is provided a transmission apparatus including a terminal electrically connected to a terminal of another apparatus, a body information acquiring unit acquiring body information of a user holding the transmission apparatus, and a transmission unit operable, by carrying out load modulation in accordance with the terminal contacting or being positioned close to the terminal of the other apparatus, to transmit, via the terminal, information on which the body information acquired by the body information acquiring unit is superimposed.

According to the above configuration, the terminal is electrically connected to the terminal of another apparatus and the body information acquiring unit acquires body information of the user holding the transmission apparatus. The transmission unit then carries out load modulation in accordance with the terminal contacting or being positioned close to the terminal of the other apparatus to transmit, via the terminal, information on which the body information acquired by the body information acquiring unit is superimposed. As a result, the transmission apparatus is capable of transmitting user information using communication conducted via a power line.

Further, according to an embodiment of the present disclosure, there is provided a reception apparatus including a terminal electrically connected to a terminal of another apparatus, and a reception unit operable, when the terminal contacts or is positioned close to the terminal of the other apparatus, to receive information on which body information acquired by the other apparatus is superimposed and which has been transmitted from the other apparatus by load modulation.

According to the above configuration, the terminal is electrically connected to the terminal of another apparatus and the reception unit is operable, when the terminal contacts and is positioned close to the terminal of the other apparatus, to receive information on which body information acquired by the other apparatus is superimposed and which has been transmitted from the other apparatus by load modulation. As a result, the reception apparatus is capable of receiving user information using communication conducted via a power line.

Further, according to an embodiment of the present disclosure, there is provided an authentication system including a transmission apparatus, and a reception apparatus. The transmission apparatus includes a terminal electrically connected to a terminal of the reception apparatus, a body information acquiring unit acquiring body information of a user holding the transmission apparatus, and a transmission unit operable, by carrying out load modulation in accordance with the terminal contacting or being positioned close to the terminal of the reception apparatus, to transmit, to the reception apparatus via the terminal, information on which the body information acquired by the body information acquiring unit is superimposed. The reception apparatus includes a terminal electrically connected to the terminal of the transmission apparatus, and a reception unit operable, when the terminal contacts or is positioned close to the terminal of the transmission apparatus, to receive information on which body information acquired by the transmission apparatus is superimposed and which has been transmitted from the transmission apparatus by load modulation.

Further, according to an embodiment of the present disclosure, there is provided a computer program for causing a computer to realize a body information acquiring unit acquiring body information of a user holding an apparatus, and a transmission unit operable, by carrying out load modulation in accordance with a terminal electrically connected to a terminal of another apparatus contacting or being positioned close to the terminal of the other apparatus, to transmit, via the terminal, information on which the body information acquired by the body information acquiring unit is superimposed.

Further, according to an embodiment of the present disclosure, there is provided a computer program for causing a computer to realize a reception unit operable, when a terminal electrically connected to a terminal of another apparatus contacts or is positioned close to the terminal of the other apparatus, to receive information on which body information acquired by the other apparatus is superimposed and which has been transmitted from the other apparatus by load modulation.

According to the embodiments of the present disclosure described above, it is possible to provide a novel and improved transmission apparatus, electronic appliance, reception apparatus, and authentication system capable of using communication conducted via power lines to easily receive user information on a user who uses an appliance receiving supplied power.

BRIEF DESCRIPTION OF THE DRAWINGS

FIG. 13 is a flowchart showing the operation of the management apparatus 100B and the electronic apparatus 200B according to an embodiment of the present disclosure.

DETAILED DESCRIPTION OF THE EMBODIMENT(S)

Figure 1:
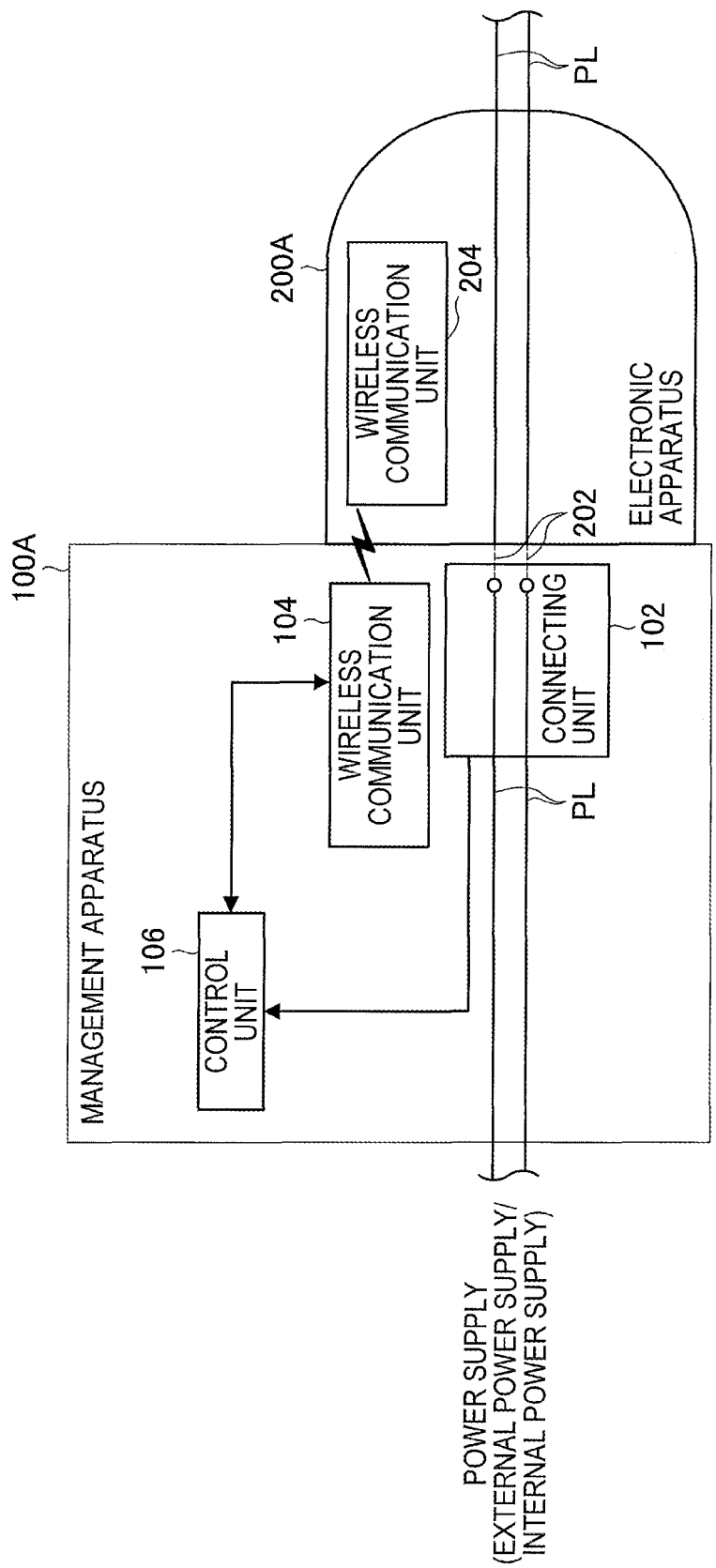
FIG. 1 is a diagram useful in explaining wireless communication according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.
1. Embodiment of the Present Disclosure
  Wireless Communication According to the Present Embodiment
  Power Line Communication According to the Present Embodiment
  Configuration of Control Unit
  Configuration of Plug
2. Conclusion

1. EMBODIMENT OF THE PRESENT DISCLOSURE

Wireless Communication According to the Present Embodiment

First, wireless communication according to the present embodiment will be described. FIG. 1 is a diagram useful in explaining wireless communication according to the present embodiment. Wireless communication according to the present embodiment is described below with a management apparatus 100A and an electronic apparatus 200A shown in FIG. 1 as examples. Note that in FIG. 1, component elements that relate to wireless communication according to the present embodiment out of the configuration of the management apparatus according to the present embodiment and the electronic apparatus according to the present embodiment are shown. Although a plug is shown in FIG. 1 as the electronic apparatus 200A, the electronic apparatus according to the present embodiment is not limited to a plug.

As one example, the management apparatus 100A includes a connecting unit 102, a wireless communication unit 104, and a control unit 106. In this example, the electronic apparatus 200A includes a connecting unit 202 and a wireless communication unit 204.

The connecting unit 102 connects a power line PL that transfers power to an external apparatus. Here, a power line that carries alternating current of a specified frequency, such as 50 Hz or 60 Hz, or direct current can be given as one example of the power line PL according to the present embodiment. An example case where alternating current of a specified frequency flows on the power line PL is described below.

In more detail, the connecting unit 102 includes pins that are connected to the power line PL and the connecting unit 202 also includes pins that are connected to the power line PL (which, from the viewpoint of the management apparatus 100A, corresponds to an "external power line"). By electrically connecting the pins of the connecting unit 102 and the pins of the connecting unit 202, the management apparatus 100A and the electronic apparatus 200A (which, from the viewpoint of the management apparatus 100A, corresponds to an "external apparatus") are connected. Here, the expression "by electrically connecting the pins of the connecting unit 102 and the pins of the connecting unit 202" for the present embodiment refers to contact between the pins included in the connecting units of the respective apparatuses or the joining of the pins included in the connecting units of the respective apparatuses using wires.

The connecting unit 102 also detects changes the connected state of an external apparatus, for example (such as a change from an unconnected state to a connected state and a change from a connected state to an unconnected state). The connecting unit 102 then transmits a detection signal showing a detected change (detection result) to the control unit 106. Note that if the wireless communication unit 104 is configured so as to include a function for transmitting a high-frequency signal (described later) in accordance with the transmission of the detection signal, the connecting unit 102 may transmit the detection signal to the wireless communication unit 104.

Here, as one example, although the connecting unit 102 includes a switch that detects the physical connection state of an external apparatus and transmits a detection signal to the control unit 106 when the state of the switch has changed, the configuration of the connecting unit 102 is not limited to this. Note that in a case where the management apparatus 100A is configured to regularly or irregularly transmit a high-frequency signal, the connecting unit 102 according to the present embodiment does not have to have a function relating to detection of a change in the connected state of an external apparatus, for example.

The wireless communication unit 104 and the wireless communication unit 204 carry out wireless communication according to the present embodiment. Communication by the wireless communication unit 104 is controlled by the control unit 106, for example.

The control unit 106 is configured using an MPU (Micro Processing Unit), an integrated circuit in which various processing circuits are integrated, or the like, and controls the various components of the management apparatus 100A. As a specific example, the control unit 106 controls communication by a power line communication unit 108 by transmitting a high-frequency signal generation instruction or a high-frequency signal transmission stopping instruction to the power line communication unit 108 based on the detection signal transmitted from the connecting unit 102 or a response signal from an externally-connected apparatus such as an electronic apparatus 200B that has been transferred from the power line communication unit 108.

Next, the communication carried out between the management apparatus according to the present embodiment and the electronic apparatus according to the present embodiment will be described. Wireless communication and power line communication (wired communication, and not limited to existing so-called "PLC") can be given as examples of the communication carried out between the management apparatus according to the present embodiment and the electronic apparatus according to the present embodiment.

More specifically, wireless communication is carried out between the management apparatus according to the present embodiment and the electronic apparatus according to the present embodiment using for example a communication technology conducted via NFC (Near Field Communication) or a wireless communication technology such as a RFID (Radio Frequency IDentification). As one example, power line communication can be carried out between the management apparatus according to the present embodiment and the electronic apparatus according to the present embodiment by adapting a communication technology conducted via NFC or a wireless communication technology such as RFID to wired communication. Here, the expression "power line communication" for the present embodiment includes, for example, communication carried out through contact between pins of the respective apparatuses (contact communication) and communication carried out by joining the pins of the respective apparatuses with wires.

As one example, the management apparatus according to the present embodiment includes a high-frequency signal generating unit (described later) that generates a high-frequency signal and transmits the high-frequency signal to a connected external apparatus. That is, the management apparatus according to the present embodiment has a so-called "reader/writer" function, for example.

The electronic apparatus according to the present embodiment carries out communication with an external apparatus, such as the management apparatus according to the present embodiment, by carrying out load modulation based on a signal transmitted from the external apparatus. As one example, on receiving a high-frequency signal transmitted from the management apparatus according to the present embodiment, the electronic apparatus according to the present embodiment obtains and is driven by obtained from the received high-frequency signal and carries out load modulation based on the result of processing the received high-frequency signal to transmit a high-frequency signal.

As one example, by having the management apparatus according to the present embodiment and the electronic apparatus according to the present embodiment carry out processing as described above, wireless communication according to the present embodiment or power line communication according to the present embodiment is realized between the management apparatus according to the present embodiment and the electronic apparatus according to the present embodiment.

Here, a signal with a frequency used for RFID and a signal with a frequency used for contactless communication can be given as examples of the high-frequency signal according to the present embodiment. Although 130 to 135 kHz, 13.56 MHz, 56 MHz, 433 MHz, 954.2 MHz, 954.8 MHz, 2441.75 MHz, and 2448.875 MHz can be given as examples of the frequency of the high-frequency signal, the frequency of the high-frequency signal according to the present embodiment is not limited to such examples. In the following description, a high-frequency wave transmitted based on high-frequency signal according to the present embodiment is sometimes also referred to as the "carrier".

Figure 2:
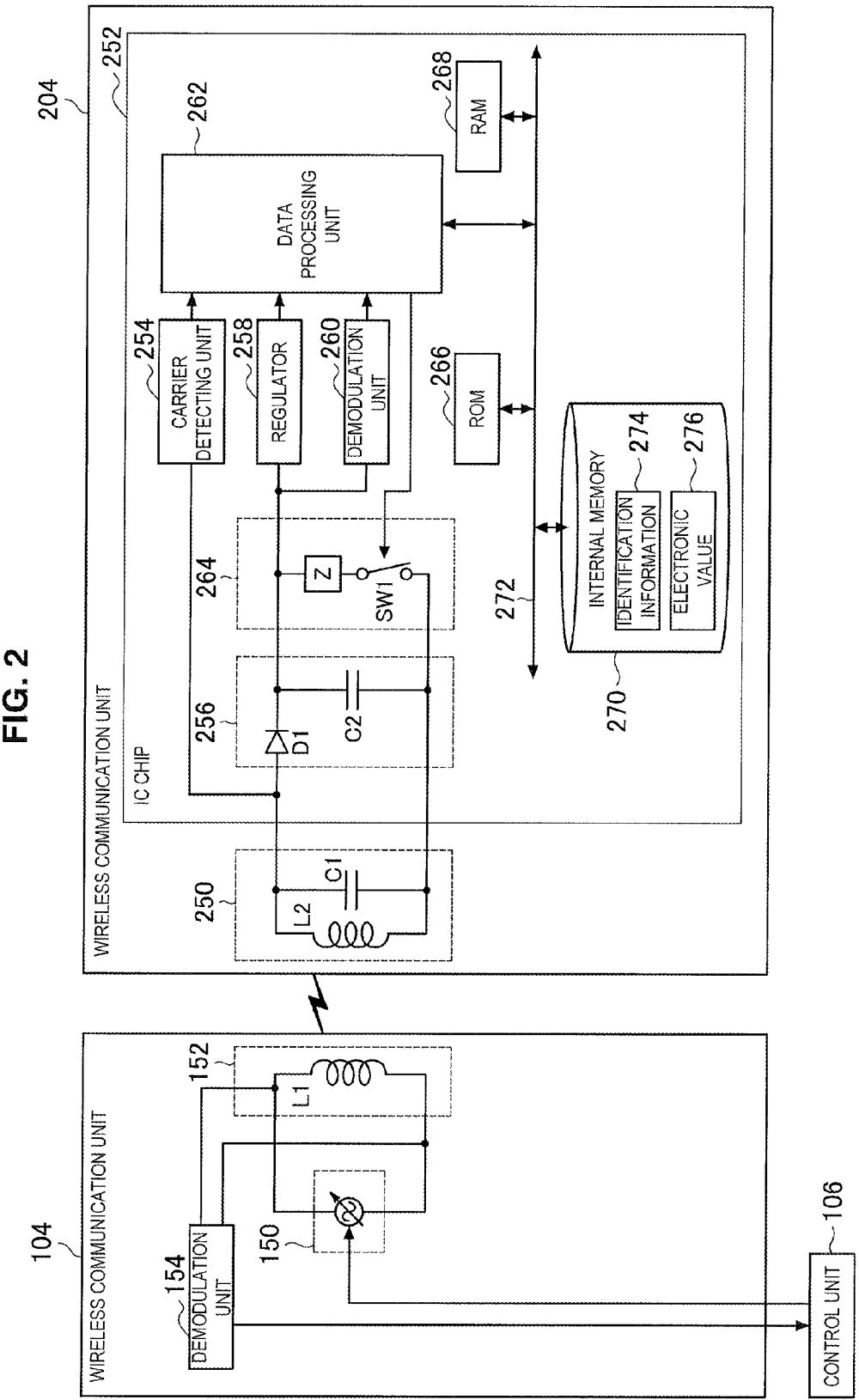
FIG. 2 is a diagram useful in explaining an example configuration for realizing wireless communication carried out between a management apparatus according to the present embodiment and an electronic apparatus according to the present embodiment.

FIG. 2 is a diagram useful in explaining an example configuration for realizing wireless communication carried out between the management apparatus according to the present embodiment and the electronic apparatus according to the present embodiment. Here, FIG. 2 shows example configurations of the wireless communication unit 104 and the control unit 106 provided in the management apparatus 100A shown in FIG. 1 and of the wireless communication unit 204 provided in the electronic apparatus 200A shown in FIG. 1.

1-1. Wireless Communication Unit 104 Provided in the Management Apparatus According to the Present Embodiment As one example, the wireless communication unit 104 includes a high-frequency signal generating unit 150, a high-frequency wave transmitting unit 152, and a demodulation unit 154. As examples, the wireless communication unit 104 transmits a high-frequency signal in accordance with a high-frequency signal generation instruction transmitted from the control unit 106 and stops the transmission of high-frequency signals in accordance with a high-frequency signal transmission stopping instruction transmitted from the control unit 106.

The wireless communication unit 104 may also include an encryption circuit (not shown) for encrypting communication, a communication collision prevention ("anti-collision") circuit, a connection interface (not shown) for connecting to an external apparatus or another circuit, and the like. Here, in the wireless communication unit 104, as one example the various component elements may be connected using a bus as a transfer path for data. Here, a UART (Universal Asynchronous Receiver Transmitter) or a LAN (Local Area Network) terminal and a transmission/reception circuit can be given as examples of a connection interface.

The high-frequency signal generating unit 150 receives a high-frequency signal generating instruction from the control unit 106 and generates a high-frequency signal in accordance with the high-frequency signal generating instruction. Here, although an alternating current power supply is shown as the high-frequency signal generating unit 150 in FIG. 2, the high-frequency signal generating unit 150 according to the present embodiment is not limited to such. As one example, the high-frequency signal generating unit 150 according to the present embodiment can be configured from a modulation circuit (not shown) that carries out ASK (Amplitude Shift Keying) modulation and an amplification circuit (not shown) that amplifies an output of the modulation circuit.

Here, a high-frequency signal including an identification information transmission request requesting an externally-connected apparatus to transmit identification information and a high-frequency signal including various processing instructions for an externally-connected apparatus and/or data to be processed can be given as examples of the high-frequency signal generated by the high-frequency signal generating unit 150. Note that the high-frequency signal generated by the high-frequency signal generating unit 150 is not limited to the above. For example, the high-frequency signal according to the present embodiment may be a signal (for example, an unmodulated signal) that acts so as to supply power to a power line communication unit 208 of the electronic apparatus 200A, described later.

The high-frequency wave transmitting unit 152 includes a coil (inductor) L1 with a specified inductance and transmits a carrier in accordance with the high-frequency signal generated by the high-frequency signal generating unit 150. The high-frequency wave transmitting unit 152 is also capable of receiving a reply signal from an externally-connected apparatus. That is, the high-frequency wave transmitting unit 152 is also capable of serving as a communication antenna of the wireless communication unit 104. Here, although an example where the high-frequency wave transmitting unit 152 is configured using a coil L1 is shown in FIG. 2, the configuration of the high-frequency wave transmitting unit 152 according to the present embodiment is not limited to the above. As one example, the high frequency transmitting unit according to the present embodiment may further include a capacitor and be configured as a resonance circuit.

The demodulation unit 154 carries out envelope detection on amplitude changes in a voltage at the antenna end of the high-frequency wave transmitting unit 152, for example, and by binarizing the detected signal, demodulates a reply signal from an externally-connected apparatus. Note that the demodulation device for the reply signal in the demodulation unit 154 is not limited to the above and the demodulation unit 154 may demodulate the reply signal using phase changes in the voltage at the antenna end of the high-frequency wave transmitting unit 152.

The demodulation unit 154 also transfers a demodulated reply signal to the control unit 106. The control unit 106 that has received the demodulated reply signal carries out various processing, such as the processing of data corresponding to the reply signal or generation of a high-frequency signal generating instruction based on a processing result.

By using the configuration shown in FIG. 2, for example, the wireless communication unit 104 transmits a carrier and demodulates the reply signal transmitted from an externally-connected apparatus such as the electronic apparatus 200A. Note that it should be obvious that the configuration of the wireless communication unit 104 according to the present embodiment is not limited to the configuration shown in FIG. 2.

The wireless communication unit 204 includes a communication antenna 250 and an IC chip 252. In the wireless communication unit 204, as one example the various component elements may be connected using a bus as a transfer path for data.

The communication antenna 250 receives the carrier wave transmitted from an externally connected apparatus such as the management apparatus 100A and transmits a reply signal based on a processing result of processing by the IC chip 252.

As one example, the communication antenna 250 is configured as a resonance circuit made up of a coil (inductor) L2 with a specified inductance and a capacitor C1 with a specified capacitance and generates an induced voltage through electromagnetic induction caused when the carrier is received. The communication antenna 250 outputs a received voltage produced by causing the induced voltage to resonate at a specified resonant frequency. Here, the resonant frequency of the communication antenna 250 is set in accordance with the frequency of the carrier at 13.56 MHz for example. By using the above configuration, the communication antenna 250 receives the carrier and carries out transmission of a reply signal according to load modulation carried out by a load modulation unit 264 (described later) provided in the IC chip 252.

The IC chip 252 demodulates and processes a high-frequency signal based on the received carrier and has a reply signal transmitted from the communication antenna 250 according to load modulation.

As one example, the IC chip 252 includes a carrier detecting unit 254, a detector unit 256, a regulator 258, a demodulation unit 260, a data processing unit 262, the load modulation unit 264, a ROM (Read Only Memory) 266, a RAM (Random Access Memory) 268, and an internal memory 270. As one example, the data processing unit 262, the ROM 266, the RAM 268, and the internal memory 270 may be connected by a bus 272 as a transfer path for data. Note that although not shown in FIG. 2, the IC chip 252 may further include a protector circuit (not shown) for preventing an overvoltage or an overcurrent from being applied to the data processing unit 262, for example. Here, a clamp circuit constructed of a diode or the like can be given as an example of the protector circuit (not shown).

The carrier detecting unit 254 generates a rectangular detection signal, for example, based on a received voltage transferred from the communication antenna 250 and transfers such detection signal to the data processing unit 262. The data processing unit 262 may also use the received detection signal as a processing clock for data processing, for example. Here, since the detection signal described above is based on a received voltage transferred from the communication antenna 250, the detection signal is synchronized with the frequency of the carrier transmitted from the externally-connected apparatus. Accordingly, by including the carrier detecting unit 254, the IC chip 252 is capable of carrying out processing with the externally-connected apparatus in synchronization with the externally-connected apparatus.

The detector unit 256 rectifies the received voltage outputted from the communication antenna 250. Here, as one example, the detector unit 256 is configured from a diode D1 and a capacitor C2.

The regulator 258 converts the received voltage to a smooth, constant voltage to output a driving voltage to the data processing unit 262. Here, as one example, the regulator 258 uses a direct current component of the received voltage as the driving voltage.

The demodulation unit 260 demodulates the high-frequency signal based on the received voltage and outputs data (for example, a data signal binarized to a high level and a low level) corresponding to the high-frequency signal included in the carrier. Here, as one example, the demodulation unit 260 outputs an alternating current component of the received voltage as data.

As one example, the data processing unit 262 is driven with the driving voltage outputted from the regulator 258 as a power supply and carries out processing of the data demodulated by the demodulation unit 260. Here, as one example, the data processing unit 262 is constructed of an MPU and/or various processing circuits and the like.

Also, the data processing unit 262 selectively generates a control signal that controls load modulation relating to the reply to the externally-connected apparatus in accordance with the processing result. The data processing unit 262 then selectively outputs the control signal to the load modulation unit 264.

In addition, the data processing unit 262 carries out reading, updating, and the like of the data stored in the internal memory 270 based on an instruction included in the data demodulated by the demodulation unit 260, for example.

As one example, the load modulation unit 264 includes a load Z and a switch SW1 and carries out load modulation by selectively connecting (validating) the load Z in accordance with a control signal transmitted from the data processing unit 262. Although as one example the load Z is constructed here of a resistor with a specified resistance, the load Z is not limited to such. Also, although the switch SW1 is constructed of a p-channel MOSFET (Metal Oxide Semiconductor Field Effect Transistor) or an n-channel MOSFET, for example, the switch SW1 is not limited to such.

The ROM 266 stores programs and control data, such as computational parameters, to be used by the data processing unit 262. The RAM 268 temporarily stores programs to be executed by the data processing unit 262 and computation results, an execution state, and the like.

The internal memory 270 is a storage device included in the IC chip 252 and is tamper-resistant, for example. As examples, data reads, new data writes, and the updating of data in the internal memory 270 are carried out by the data processing unit 262. A variety of data, such as identification information, electronic value (currency or data with a value based on currency), and applications, is stored in the internal memory 270. Here, although an example where identification information 274 and electronic value 276 is stored by the internal memory 270 is shown in FIG. 2, the data stored in the internal memory 270 is not limited to such.

By using the configuration described above and shown in FIG. 2, for example, the IC chip 252 processes the high-frequency signal received by the communication antenna 250 and has a reply signal transmitted from the communication antenna 250 according to load modulation.

As one example, by including the communication antenna 250 and the IC chip 252, the wireless communication unit 204 processes the high-frequency signal transmitted from an externally-connected apparatus such as the management apparatus 100A and has a reply signal transmitted according to load modulation. Note that the configuration of the wireless communication unit 204 according to the present embodiment is not limited to the configuration shown in FIG. 2. For example, the wireless communication unit 204 does not have to include the various component elements that construct the IC chip 252 shown in FIG. 2 for example in the form of an IC (Integrated Circuit) chip.

If for example the management apparatus according to the present embodiment includes the wireless communication unit 104 shown in FIG. 2 and the electronic apparatus according to the present embodiment includes the wireless communication unit 204 shown in FIG. 2, the management apparatus according to the present embodiment and the electronic apparatus according to the present embodiment will be capable of carrying out wireless communication using a wireless communication technology such as a communication technology conducted via NFC.

Power Line Communication According to the Present Embodiment

Figure 3:
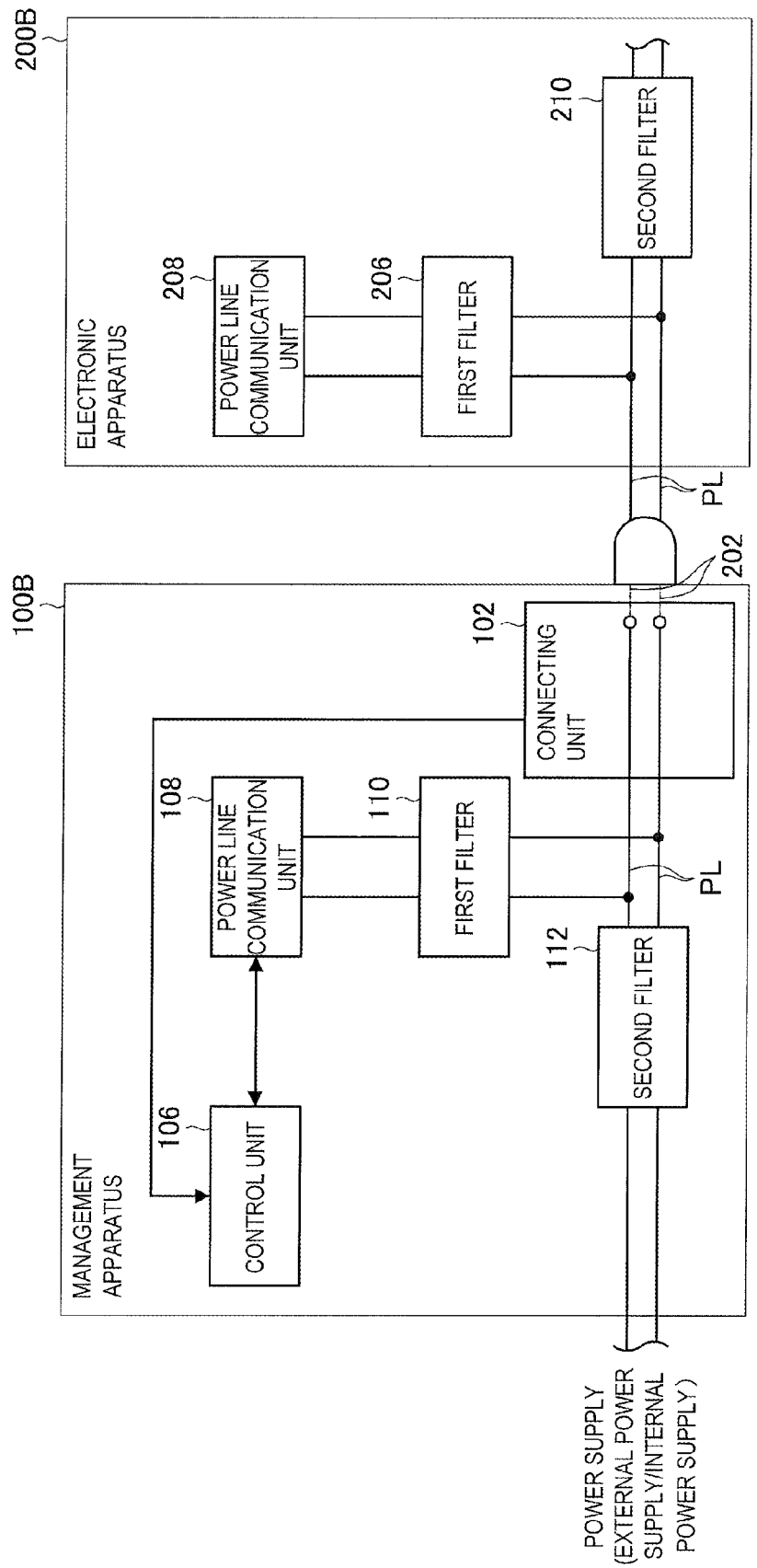
FIG. 3 is a diagram useful in explaining power line communication according to the present embodiment.

Next, power line communication according to the present embodiment will be described. FIG. 3 is a diagram useful in explaining power line communication according to the present embodiment. Power line communication according to the present embodiment will be described below with a management apparatus 100B and an electronic apparatus 200B shown in FIG. 3 as examples. Note that in FIG. 3, component elements relating to power line communication according to the present embodiment are shown out of the configuration of the management apparatus according to the present embodiment and the configuration of the electronic apparatus according to the present embodiment. Note that the component elements relating to power line communication in the electronic apparatus according to the present embodiment may be provided in a plug in the same way as in the electronic apparatus 200A shown in FIG. 1, for example.

2-1. Management Apparatus 100B

The management apparatus 100B includes for example the connecting unit 102, the control unit 106, the power line communication unit 108, a first filter 110, and a second filter 112.

As one example, the management apparatus 100B may include a ROM (not shown), a RAM (not shown), a storage unit (not shown), a display unit (not shown), and the like. The various component elements of the management apparatus 100B may be connected by a bus as a transfer path for data. Here, the ROM (not shown) stores programs and control data, such as computation parameters, to be used by the control unit 106. The RAM (not shown) temporarily stores programs and the like to be executed by the control unit 106.

The storage unit (not shown) stores various data, such as identification information acquired from an externally-connected apparatus such as the electronic apparatus 200B and applications. Here, a magnetic recording medium such as a hard disk drive or a nonvolatile memory such as an EEPROM (Electrically Erasable and Programmable Read Only Memory), flash memory, MRAM (Magnetoresistive Random Access Memory), FeRAM (Ferroelectric Random Access Memory), or PRAM (Phase change Random Access Memory) can be given as examples of the storage unit (not shown). The storage unit (not shown) may also be removably attached to the management apparatus 100B.

The display unit (not shown) is a display device provided in the management apparatus 100B and displays a variety of information (for example, images and/or text) on a display screen. An operation screen for causing the management apparatus 100B to carry out a desired operation can be given as an example of a screen displayed on the display screen of the display unit (not shown).

Display devices such as an LCD (Liquid Crystal Display), an organic EL (ElectroLuminescence) display, and an OLED (Organic Light Emitting Diode display) can be given as examples of the display unit (not shown). As another example, the management apparatus 100B is also capable of being configured with a touch screen as the display unit (not shown). In such case, the display unit (not shown) functions as an operation display unit capable of both user operations and displaying.

Note that regardless of whether or not a display unit (not shown) is provided, it is also possible for the management apparatus 100B to carry out communication with an external terminal via a network (or directly) and having the operation screen described above and/or various information displayed on a display screen of such external terminal. As one example, if the external terminal is an external terminal (as examples, a mobile communication apparatus or a remote controller) owned by the user of the management apparatus 100B, the user is capable of operating their own external terminal to have the management apparatus 100B carry out desired processing and of confirming information transmitted from the management apparatus 100B using the external terminal. Therefore, in the case described above, it is possible to increase the convenience for the user even when it is not easy for the user to directly operate the management apparatus 100B or to see the information displayed on the display unit (not shown), such as when the management apparatus 100B is set up below a desk or the like.

The control unit 106 is configured using an MPU and/or an integrated circuit or the like in which various processing circuits are integrated and controls the various components of the management apparatus 100B. More specifically, as examples, the control unit 106 transmits a high-frequency signal generation instruction or a high-frequency signal transmission stopping instruction to the power line communication unit 108 to control communication by the power line communication unit 108 based on a detection signal transmitted from the connecting unit 102 and/or on a reply signal from an externally-connected apparatus, such as the electronic apparatus 200B, transferred from the power line communication unit 108. By transmitting a high-frequency signal generation instruction and/or a high-frequency signal transmission stopping instruction to the power line communication unit 108 based on the detection signal mentioned above, the control unit 106 is capable of carrying out communication with an externally-connected apparatus that is an external apparatus connected in reality via a power line.

Due to the control unit 106 transmitting a high-frequency signal generation instruction or a high-frequency signal transmission stopping instruction as described above to the power line communication unit 108, the power line communication unit 108 is capable of transmitting a high-frequency signal based on the detection result of the connecting unit 102, for example. Also, by transmitting a high-frequency signal generation instruction or a high-frequency signal transmission stopping instruction based on the reply signal described above to the power line communication unit 108, the control unit 106 is capable of controlling communication via a power line with an externally-connected apparatus such as the electronic apparatus 200B. Note that by transmitting a high-frequency signal transmission generation instruction regularly or irregularly to the power line communication unit 108, the control unit 106 may regularly or irregularly cause the power line communication unit 108 to transmit a high-frequency signal.

The power line communication unit 108 communicates via a power line with an externally-connected apparatus such as the electronic apparatus 200B.

Figure 4:
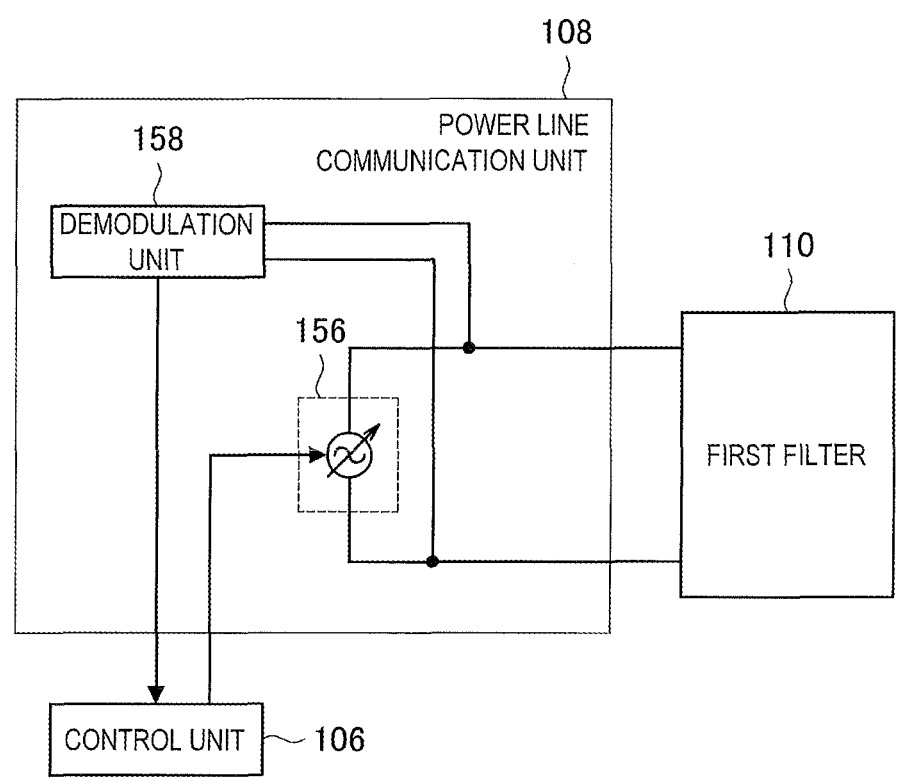
FIG. 4 is a diagram useful in explaining an example configuration of a power line communication unit provided in the management apparatus according to the present embodiment.

FIG. 4 is a diagram useful in explaining one example configuration of the power line communication unit 108 provided in the management apparatus 100B according to the present embodiment. Here, in FIG. 4, the power line communication unit 108 is shown together with the control unit 106 and the first filter 110. As one example, the power line communication unit 108 includes a high-frequency signal generating unit 156 and a demodulation unit 158, and acts as a reader/writer (or interrogator) for NFC or the like. As examples, the power line communication unit 108 may also include an encryption circuit (not shown), a communication collision prevention ("anti-collision") circuit, or the like.

As one example, the high-frequency signal generating unit 156 receives a high-frequency signal generation instruction transferred from the control unit 106 and generates a high-frequency signal in accordance with the high-frequency signal generation instruction. The high-frequency signal generating unit 156 also receives a high-frequency signal transmission stopping instruction, which indicates a stopping of transmission of high-frequency signals and was transferred from the control unit 106, for example, and stops the generation of high-frequency signals. Here, although an alternating current power supply is shown as the high-frequency signal generating unit 156 in FIG. 4, the high-frequency signal generating unit 156 according to the present embodiment is not limited to such. As one example, a high-frequency signal generating unit 132 according to the present embodiment may include a modulation circuit (not shown) that carries out ASK modulation and an amplification circuit (not shown) that amplifies the output of the modulation circuit.

Here, a high-frequency signal including an identification information transmission request requesting an externally-connected apparatus to transmit identification information and a high-frequency signal including various processing instructions for an externally-connected apparatus and/or data to be processed can be given as examples of the high-frequency signal generated by the high-frequency signal generating unit 156. Note that the high-frequency signal generated by the high-frequency signal generating unit 156 is not limited to the above. For example, the high-frequency signal according to the present embodiment may be a signal (for example, an unmodulated signal) that supplies power to the power line communication unit 208 of the electronic apparatus 200B, described later.

The demodulation unit 158 carries out envelope detection on amplitude changes in a voltage between the high-frequency signal generating unit 156 and the first filter 110, for example, and by binarizing the detected signal, demodulates a reply signal to be transmitted from an externally-connected apparatus. After this, the demodulation unit 158 transmits the demodulated reply signal (for example, a reply signal showing identification information or a reply signal showing a reply based on processing in accordance with the high-frequency signal) to the control unit 106. Note that the demodulation device for the reply signal in the demodulation unit 158 is not limited to the above and the demodulation unit 158 may demodulate the reply signal using phase changes in the voltage between the high-frequency signal generating unit 156 and the first filter 110.

By using the configuration shown in FIG. 4, for example, the power line communication unit 108 according to the present embodiment may act as a reader/writer for NFC or the like and may carry out communication with an externally-connected apparatus via a power line.

Figure 5:
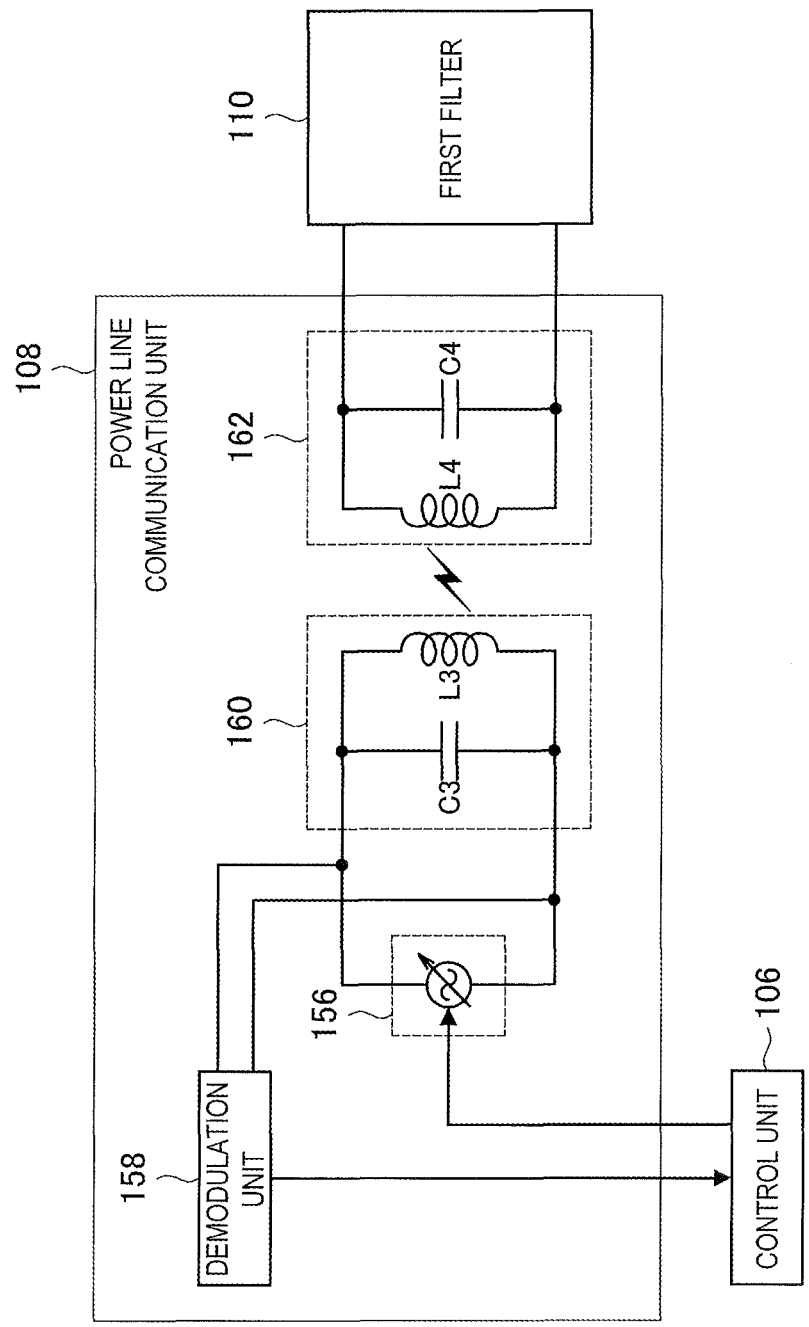
FIG. 5 is a diagram useful in explaining another example of a power line communication unit included in the management apparatus according to the present embodiment.

Note that the configuration of the power line communication unit 108 according to the present embodiment is not limited to the configuration shown in FIG. 4. FIG. 5 is a diagram useful in explaining another example of the power line communication unit 108 provided in the management apparatus 100B according to the present embodiment. Here, in FIG. 5, in the same way as in FIG. 4, the power line communication unit 108 is shown together with the control unit 106 and the first filter 110.

The power line communication unit 108 according to this other example includes the high-frequency signal generating unit 156, the demodulation unit 158, a first high frequency transmission/reception unit 160, and a second high frequency transmission/reception unit 162. The power line communication unit 108 according to this example may also include an encryption circuit (not shown), a communication collision prevention ("anti-collision") circuit, and the like.

In the same way as the high-frequency signal generating unit 156 shown in FIG. 4, the high-frequency signal generating unit 156 generates a high-frequency signal in accordance with a high-frequency signal generation instruction and stops the generation of high-frequency signals in accordance with a high-frequency signal transmission stopping instruction.

The demodulation unit 158 carries out envelope detection on amplitude changes in a voltage at the antenna end of the high-frequency signal generating unit 156, and by binarizing the detected signal, demodulates a reply signal to be transmitted from an externally-connected apparatus. Note that the demodulation device for the reply signal in the demodulation unit 158 is not limited to the above and the demodulation unit 158 may demodulate the reply signal using phase changes in the voltage at the antenna end of the high-frequency signal generating unit 156, for example.

As one example, the first high frequency transmission/reception unit 160 includes a coil (or "inductor", this also applies hereinafter) L3 that has a specified inductance and a capacitor C3 with a specified capacitance and is configured as a resonance circuit. Here, a frequency of the high-frequency signal, such as 13.56 MHz, can be given as the resonant frequency of the high-frequency signal generating unit 156. By using the above configuration, the first high frequency transmission/reception unit 160 is capable of transmitting a high-frequency signal generated by the high-frequency signal generating unit 156 and receiving a reply signal that is to be transmitted from the second high frequency transmission/reception unit 162 and has been transmitted from an externally-connected apparatus. That is, the first high frequency transmission/reception unit 160 acts as a first communication antenna in the power line communication unit 108.

As one example, the second high frequency transmission/reception unit 162 includes a coil L4 with a specified inductance and a capacitor C4 with a specified capacitance and is configured as a resonance circuit. Here, a frequency of the high-frequency signal, such as 13.56 MHz, can be given as the resonant frequency of the second high frequency transmission/reception unit 162. By using the above configuration, the second high frequency transmission/reception unit 162 is capable of receiving a high-frequency signal transmitted from the first high frequency transmission/reception unit 160 and transmitting a reply signal that has been transmitted from an externally-connected apparatus. That is, the second high frequency transmission/reception unit 162 acts as a second communication antenna in the power line communication unit 108.

With the configuration shown in FIG. 5, in the same way as with the configuration shown in FIG. 4, the power line communication unit 108 according to the present embodiment acts as a reader/writer for NFC or the like and can also act so as to communicate with an externally-connected apparatus via a power line.

The description will now return to the example configuration relating to power line communication according to the present embodiment in the management apparatus 100B according to the present embodiment with reference to FIG. 3. The first filter 110 is connected between the power line communication unit 108 and the power line PL and acts so as to filter signals to be transferred from the power line PL. More specifically, the first filter 110 has a function that blocks, out of the signals to be transferred from the power line PL, at least signals of a frequency of the power supplied to an externally-connected apparatus such as the electronic apparatus 200B via a power line and does not block high-frequency signals. Since, due to the provision of the first filter 110, signals of the frequency of the power that can produce noise are not transmitted to the power line communication unit 108, the management apparatus 100B is capable of improving the precision of communication between the power line communication unit 108 and the externally-connected apparatus (more specifically, a power line communication unit provided in such externally-connected apparatus, such as the power line communication unit 208 of the electronic apparatus 200B, described later).

Figure 6:
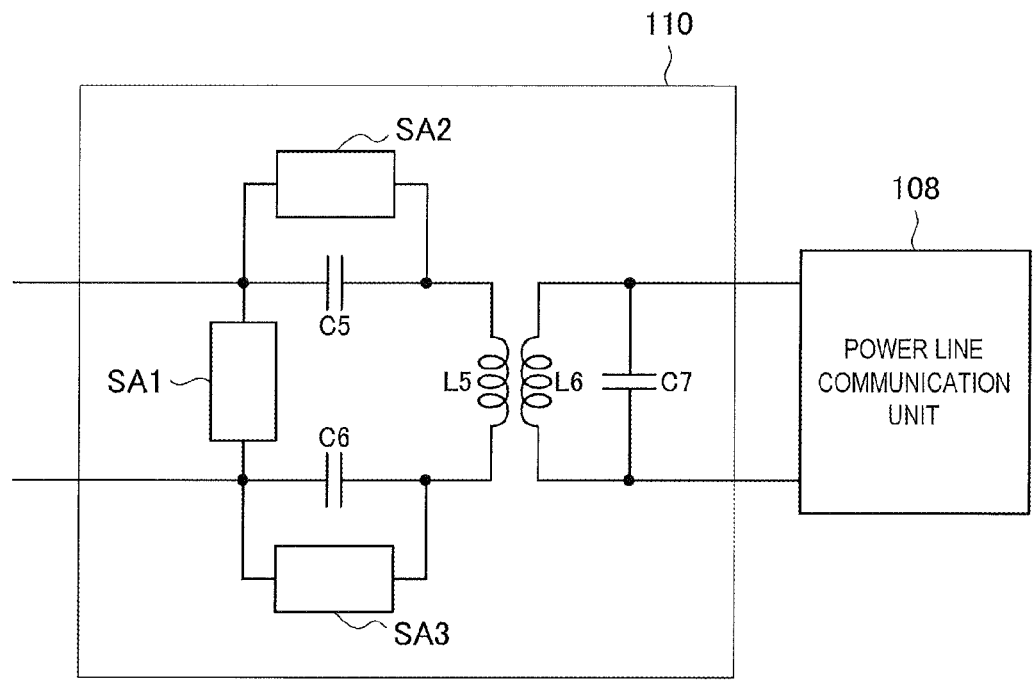
FIG. 6 is a diagram useful in explaining an example configuration of a first filter included in the management apparatus according to the present embodiment.

FIG. 6 is a diagram useful in explaining an example configuration of the first filter 110 provided in the management apparatus 100B according to the present embodiment. The first filter 110 includes inductors L5 and L6, capacitors C5 to C7, and surge absorbers SA1 to SA3. Note that it should be obvious that the configuration of the first filter 110 according to the present embodiment is not limited to the configuration shown in FIG. 6.

The description will now return to the example configuration relating to power line communication according to the present embodiment in the management apparatus 100B according to the present embodiment with reference to FIG. 3. The second filter 112 is connected between the connecting unit 102 and the power line PL and acts so as to filter signals that can be transmitted from the connecting unit 102. Here, an external power supply, such as a commercial power supply, or an internal power supply, such as a battery, can be given as examples of the power supply according to the present embodiment.

More specifically, the second filter 112 has a function that blocks at least a high-frequency signal transmitted by the power line communication unit 108 and/or a high-frequency signal transmitted by an externally-connected apparatus and does not block a signal of a frequency of the power to be supplied to the externally-connected apparatus. By including the second filter 112, the management apparatus 100B is capable for example of blocking a high-frequency signal relating to communication via a power line and a noise component, such as a noise component that may be transferred from the externally-connected apparatus side. That is, the second filter 112 acts as a so-called "power splitter".

Figure 7:
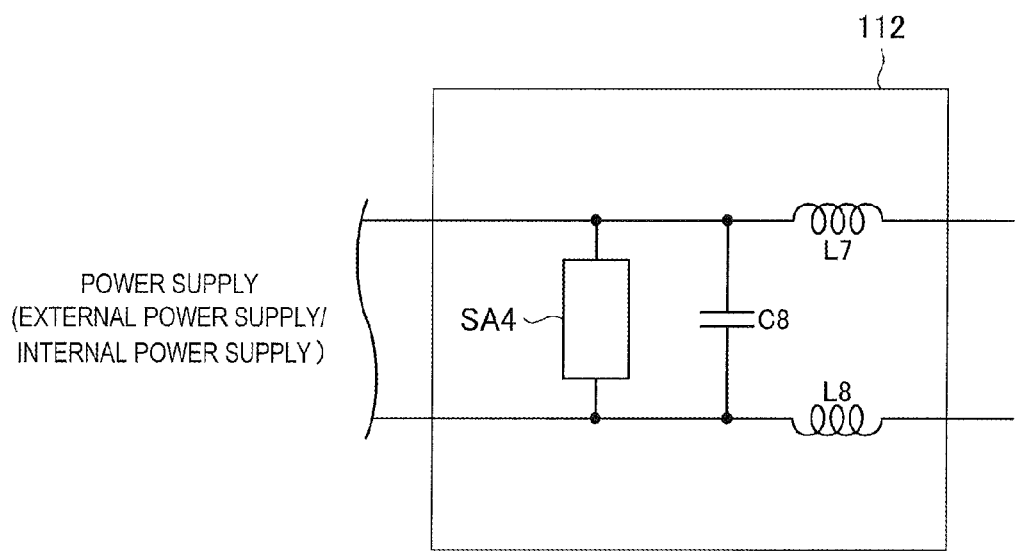
FIG. 7 is a diagram useful in explaining an example configuration of a second filter included in the management apparatus according to the present embodiment.

FIG. 7 is a diagram useful in explaining an example configuration of the second filter 112 provided in the management apparatus 100B according to the present embodiment. The second filter 112 includes inductors L7 and L8, a capacitor C8, and a surge absorber SA4. Note that it should be obvious that the configuration of the second filter 112 according to the present embodiment is not limited to the configuration shown in FIG. 7.

By using the configuration shown in FIG. 3, for example, the management apparatus 100B according to the present embodiment is capable of communication via a power line with an externally-connected apparatus, such as the electronic apparatus 200B, that is connected to the connecting unit 102. Also, by using the configuration shown in FIG. 3 for example, the management apparatus 100B according to the present embodiment is capable for example of having an externally-connected apparatus transmit identification information or carry out specified processing, such as a billing process using electronic value, based on the transmitted high-frequency signal.

As one example, the electronic apparatus 200B includes the connecting unit 202, a first filter 206, the power line communication unit 208, and a second filter 210.

The electronic apparatus 200B includes a battery (not shown) and various devices (such as an MPU, various processing circuits, and a driving device, not shown) for realizing the functions of the electronic apparatus 200B disposed for example downstream of the second filter 210 (on the opposite side of the second filter 210 shown in FIG. 3 to the management apparatus 100B). That is, the electronic apparatus 200B is capable of charging the battery (not shown) mentioned above with power supplied via the power line from an externally-connected apparatus such as the management apparatus 100B, for example, and of realizing the functions of the electronic apparatus 200B using the supplied power. For example, if the electronic apparatus 200B is a vehicle such as an electric car, the electronic apparatus 200B receives supplied power, charges an installed battery, and then uses the power in the battery to rotate the wheels. Also, if the electronic apparatus 200B includes a display device capable of displaying images (moving images or still images) and/or text, the electronic apparatus 200B receives the supplied power and has images and/or text displayed on the display screen of the display device.

The first filter 206 is connected between a power line (more precisely, the power line PL inside the electronic apparatus 200B) and the power line communication unit 208 and acts so as to filter signals transferred from the power line. More specifically, out of the signals transferred from the power line, the first filter 206 has a function for blocking at least signals of a frequency of the power and does not block high-frequency signals. Due to the electronic apparatus 200B including the first filter 206, signals of the frequency of the power that can become noise are not transferred to the power line communication unit 208, which means that it is possible to improve the precision of communication between the power line communication unit 208 and an externally-connected apparatus (more precisely, a power line communication unit provided in an externally-connected apparatus, such as the power line communication unit 108 of the management apparatus 100B, for example).

Here, the first filter 206 has the same configuration as the first filter 110 of the management apparatus 100B shown in FIG. 6 for example. Note that it should be obvious that the configuration of the first filter 206 according to the present embodiment is not limited to the configuration shown in FIG. 6.

The power line communication unit 208 carries out communication via a power line with an externally-connected apparatus such as the management apparatus 100B using high-frequency signals. More specifically, if a high-frequency signal transmitted from an externally-connected apparatus, for example, has been received, the power line communication unit 208 obtains and is driven by power from the high-frequency signal and carries out processing based on the received high-frequency signal. The power line communication unit 208 then transmits a reply signal in accordance with such processing as a high-frequency signal according to load modulation.

As one example, if a high-frequency signal including an identification information transmission request that requests transmission of identification information has been received, the power line communication unit 208 reads stored identification information based on the identification information transmission request included in the high-frequency signal. The power line communication unit 208 then transmits the read identification information superimposed on the power line using load modulation. Also, if a high-frequency signal including various processing instructions and/or data to be processed has been received for example, the power line communication unit 208 carries out processing based on the processing instructions and/or data included in the high-frequency signal. The power line communication unit 208 then transmits a reply signal based on such processing superimposed on the power line using load modulation. That is, the power line communication unit 208 acts as a responder in NFC, for example.

Figure 8:
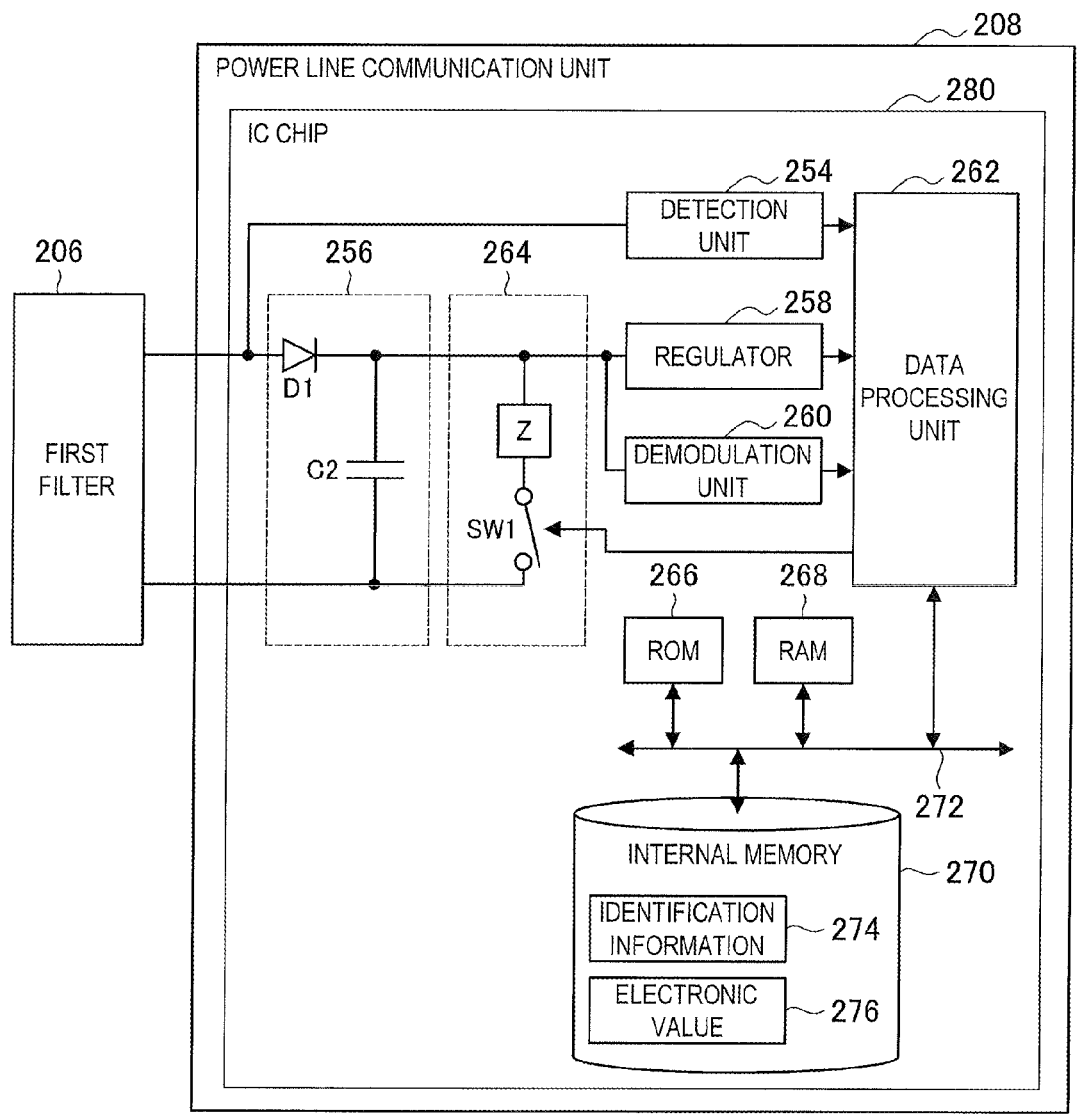
FIG. 8 is a diagram useful in explaining an example configuration of a power line communication unit included in the electronic apparatus according to the present embodiment.

FIG. 8 is a diagram useful in explaining one example configuration of the power line communication unit 208 provided in the electronic apparatus 200B according to the present embodiment. Here, the power line communication unit 208 is shown in FIG. 8 together with the first filter 206. In FIG. 8, the power line communication unit 208 is shown as having a configuration including an IC chip 280 that demodulates and processes a received high-frequency signal and transmits a reply signal according to load modulation. Note that the power line communication unit 208 according to the present embodiment does not have to include the various component elements that construct the IC chip 280 shown in FIG. 8 in the form of an IC chip.

As one example, the IC chip 280 includes a carrier detecting unit 254, a wave detector 256, a regulator 258, a demodulation unit 260, a data processing unit 262, and a load modulation unit 264. Note that although not shown in FIG. 8, the IC chip 280 may further include a protector circuit (not shown) for preventing an overvoltage or an overcurrent from being applied to the data processing unit 262, for example. Here, a clamp circuit constructed of a diode or the like can be given as an example of the protector circuit (not shown).

The IC chip 280 includes a ROM 234, a RAM 236, and an internal memory 238. As one example, in the data processing unit 262, the ROM 234, the RAM 236, and the internal memory 238 are connected by a bus 240 as a transfer path for data.

Here, if the configuration of the IC chip 280 shown in FIG. 8 and the configuration of the IC chip 252 that is included in the wireless communication unit 204 shown in FIG. 2 and relates to wireless communication according to the embodiment described above are compared, it can be understood that the IC chip 280 has the same configuration as the IC chip 252 shown in FIG. 2.

As described above, a high-frequency signal is inputted into the IC chip 252 shown in FIG. 2 based on the carrier received by the communication antenna 250, the IC chip 252 demodulates and processes the high-frequency signal based on the carrier received by the communication antenna 250, and has a reply signal transmitted from the communication antenna 250 according to load modulation. On the other hand, a high-frequency signal that has been transmitted from an externally-connected apparatus, such as the management apparatus 100B, and transferred from the first filter 206 is inputted into the IC chip 280. As shown in FIG. 8, the IC chip 280 has the same configuration as the IC chip 252 shown in FIG. 2. Accordingly, in the same way as the IC chip 252 shown in FIG. 2, the IC chip 280 is capable of demodulating and processing the inputted high-frequency signal and of transmitting a reply signal in accordance with the high-frequency signal according to load modulation.

As shown in FIG. 8, the IC chip 280 is connected to the first filter 206 and as shown in FIG. 3, the first filter 206 is connected to the power line PL. Accordingly, a reply signal transmitted from the IC chip 280 is superimposed on the power line via the first filter 206.

By using the configuration shown in FIG. 8, for example, the IC chip 280 processes the received high-frequency signal and has the reply signal transmitted superimposed on the power line according to load modulation. Note that it should be obvious that the configuration of the IC chip 280 according to the present embodiment is not limited to the configuration shown in FIG. 8.

By using the configuration shown in FIG. 8, for example, the power line communication unit 208 is capable of obtaining and being driven by power from a received high-frequency signal, carrying out processing indicated by the received high-frequency signal, and transmitting a reply signal in accordance with such processing according to load modulation.

Figure 9:
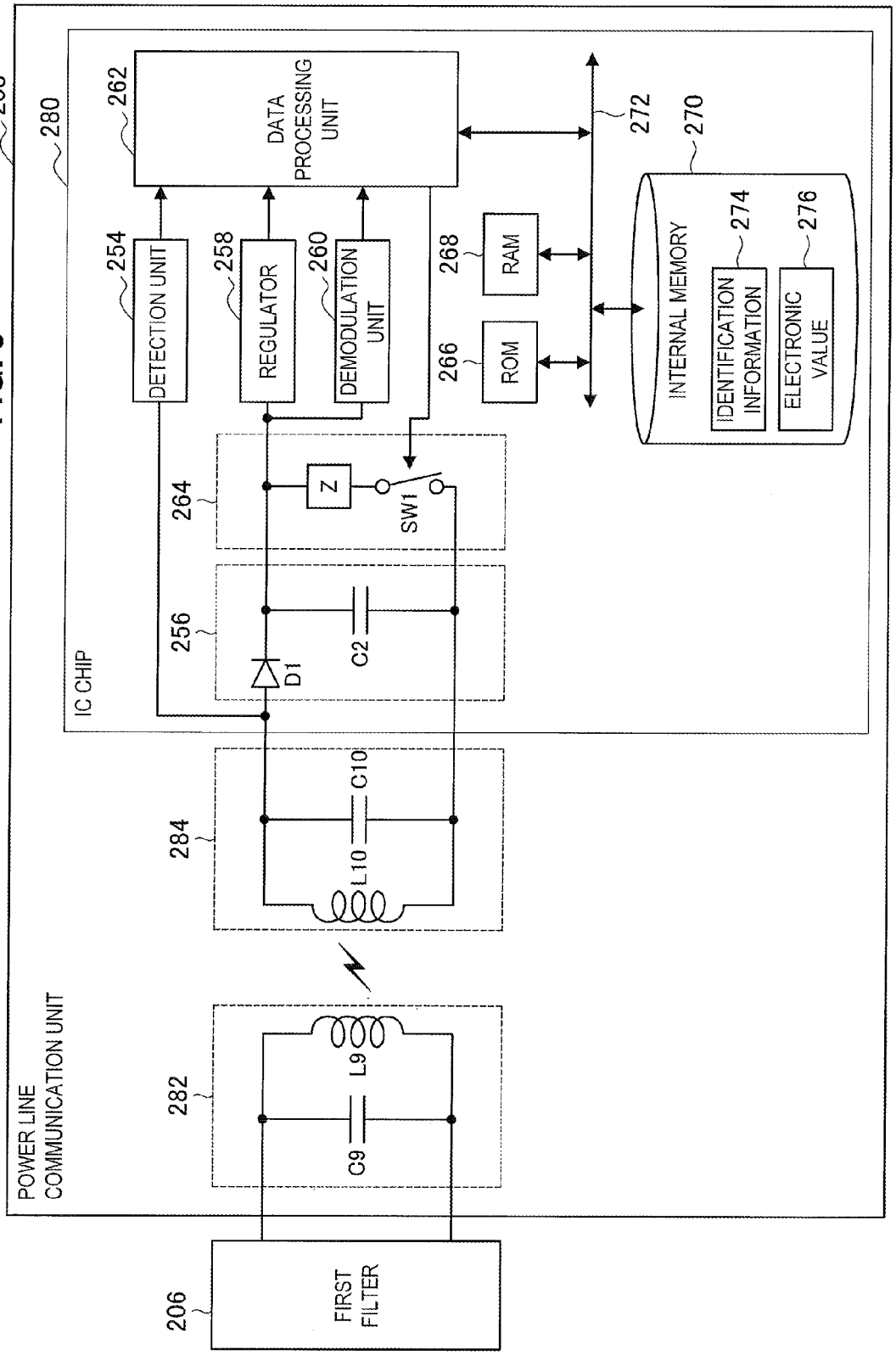
FIG. 9 is a diagram useful in explaining another example of a power line communication unit included in the electronic apparatus according to the present embodiment.

Note that the configuration of the power line communication unit 208 according to the present embodiment is not limited to the configuration shown in FIG. 8. FIG. 9 is a diagram useful in explaining another example configuration of the power line communication unit 208 provided in the electronic apparatus 200B according to the present embodiment. Here, the power line communication unit 208 is shown together with the first filter 206 in FIG. 9. Note that the power line communication unit 208 according to the present embodiment does not have to include the various component elements that construct the IC chip 280 shown in FIG. 9 in the form of an IC chip.

The power line communication unit 208 according to this other example includes a first frequency transmitting/receiving unit 282, a second frequency transmitting/receiving unit 284, and the IC chip 280.

As one example, the first frequency transmitting/receiving unit 282 includes a coil L9 with a specified inductance and a capacitor C9 with a specified capacitance and is configured as a resonance circuit. Here, a frequency of the high-frequency signal, such as 13.56 MHz, can be given as an example of the resonant frequency of the first frequency transmitting/receiving unit 282. By using the above configuration, the first frequency transmitting/receiving unit 282 is capable of transmitting a high-frequency signal transferred from the first filter 206 and receiving a reply signal that is to be transmitted from the second frequency transmitting/receiving unit 284. That is, the first frequency transmitting/receiving unit 282 acts as a first communication antenna in the power line communication unit 208.

As one example, the second frequency transmitting/receiving unit 284 includes a coil L10 with a specified inductance and a capacitor C10 with a specified capacitance and is configured as a resonance circuit. Here, a frequency of the high-frequency signal, such as 13.56 MHz, can be given as an example of the resonant frequency of the second frequency transmitting/receiving unit 284. By using the above configuration, the second frequency transmitting/receiving unit 284 is capable of receiving a high-frequency signal transmitted from the first frequency transmitting/receiving unit 282 and transmitting a reply signal. More specifically, the second frequency transmitting/receiving unit 284 generates an induced voltage through electromagnetic induction when the high-frequency signal is received and outputs a received voltage produced by causing the induced voltage to resonate at a specified resonant frequency to the IC chip 280. The second frequency transmitting/receiving unit 284 also carries out transmission of a reply signal according to load modulation carried out by the load modulation unit 264 provided in the IC chip 280. That is, the second frequency transmitting/receiving unit 284 acts as a second communication antenna inside the power line communication unit 208.

The IC chip 280 carries out the same processing as the IC chip 280 shown in FIG. 8 based on the received voltage transferred from the second frequency transmitting/receiving unit 284.

Even with the configuration shown in FIG. 9, in the same way as the configuration shown in FIG. 8, the power line communication unit 208 is capable of obtaining and being driven by power from the received high-frequency signal, carrying out the processing indicated by the received high-frequency signal, and transmitting a reply signal in accordance with such processing according to load modulation. If the power line communication unit 208 has the configuration shown in FIG. 9, since it is possible to use an existing IC chip relating to NFC or RFID for example, there is an advantage of easier implementation.

The description will now return to the example configuration relating to power line communication according to the present embodiment in the management apparatus 200B according to the present embodiment with reference to FIG. 3. The second filter 210 acts so as to filter signals that may be transmitted from an externally-connected apparatus, such as the management apparatus 100B, via the power line PL. More specifically, the second filter 210 has a function for blocking at least a high-frequency signal transmitted by an externally-connected apparatus and/or a high-frequency signal transmitted by the power line communication unit 208 and not blocking a signal of the frequency of power supplied via the power line PL. By including the second filter 210, the electronic apparatus 200B is capable for example of blocking high-frequency signals relating to communication via the power line and noise components, such as noise components that may be transmitted from the externally-connected apparatus side. That is, the second filter 210 acts as a so-called "power splitter" in the same way as the second filter 112 provided in the management apparatus 100B.

Here, the second filter 210 is capable of using the same configuration as the second filter 112 of the management apparatus 100B shown in FIG. 7B, for example. Note that it should be obvious that the configuration of the second filter 210 according to the present embodiment is not limited to the configuration shown in FIG. 7.

Due to the management apparatus according to the present embodiment including the power line communication unit 108 shown in FIG. 3 and the electronic apparatus according to the present embodiment including the power line communication unit 208 shown in FIG. 3 for example, it is possible for the management apparatus according to the present embodiment and the electronic apparatus according to the present embodiment to carry out power line communication where a wireless communication technology, such as a communication technology conducted via NFC, is adapted to wired communication.

A communication device that uses a wireless communication technology such as a communication technology conducted via NFC has an extremely small circuit scale compared to an existing PLC (Power Line Communication) modem or the like, which allows miniaturization to the size of an IC chip, for example. Also, due to the increasingly widespread use of apparatuses, such as IC cards and mobile phones equipped with IC chips, capable of communication using a wireless communication technology such as a communication technology conducted via NFC, communication devices that use wireless communication technology such as a communication technology that conducted via NFC or RFID technology are comparatively cheap compared to an existing PLC modem.

In addition, by adapting a wireless communication technology such as a communication technology that conducted via NFC or RFID technology, the electronic apparatus according to the present embodiment is capable of obtaining and being driven by power from a high-frequency signal received via a power line and transmitting stored information by carrying out load modulation. That is, in a communication system that includes the management apparatus according to the present embodiment and the electronic apparatus according to the present embodiment, the electronic apparatus according to the present embodiment is capable of carrying out wired communication even when a separate power supply circuit for carrying out communication is not provided. The electronic apparatus according to the present embodiment is also capable for example of transmitting stored information by carrying out load modulation even without a signal (a signal showing a user instruction) being inputted in accordance with a user operation.

Accordingly, by using a wireless communication technology such as a communication technology conducted via NFC or RFID technology, compared to when existing wired communication, such as existing PLC is used, it is possible for example to realize wired communication that can achieve benefits such as reducing cost, relaxing the limitations on the size of communication devices, and reducing power consumption.

Configuration of Control Unit

Next, the functional configuration of the control unit 106 included in the management apparatus 100A or the management apparatus 100B according to an embodiment of the present disclosure will be described.

Figure 10:
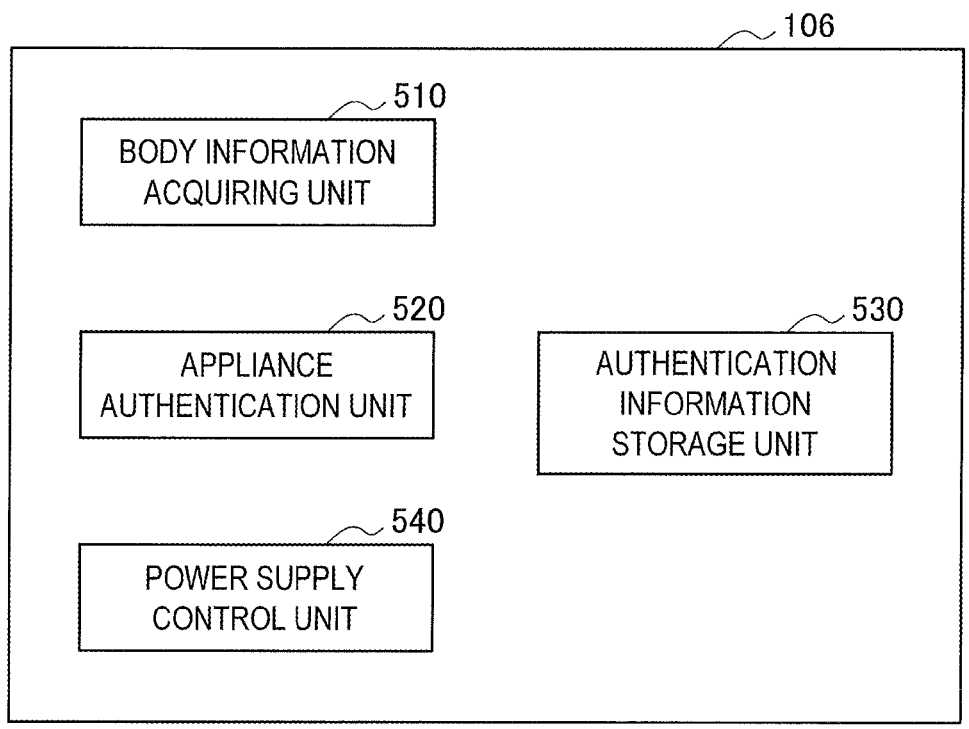
FIG. 10 is a diagram useful in explaining the functional configuration of a control unit 106 included in the management apparatus 100A or the management apparatus 100B according to an embodiment of the present disclosure.

FIG. 10 is a diagram useful in explaining the functional configuration of the control unit 106 included in the management apparatus 100A or the management apparatus 100B according to an embodiment of the present disclosure. The following description has a premise that the management apparatus 100B and the management apparatus 100B are electrically connected. The functional configuration of the control unit 106 is described below with reference to FIG. 10.

As shown in FIG. 10, the control unit 106 includes a body information acquiring unit 510, an appliance authentication unit 520, an authentication information storage unit 530, and a power supply control unit 540.

When an electronic apparatus 200B has been electrically connected to the management apparatus 100B, the body information acquiring unit 510 acquires body information that has been acquired by the electronic apparatus 200B and superimposed on the power line. On acquiring the body information from the electronic apparatus 200B, the body information acquiring unit 510 supplies the acquired body information to the appliance authentication unit 520.

The appliance authentication unit 520 uses the body information supplied from the body information acquiring unit 510 to carry out an authentication process for the electronic apparatus 200B. As the authentication process for the electronic apparatus 200B, the appliance authentication unit 520 carries out an authentication process that uses apparatus information on the electronic apparatus 200B stored in the authentication information storage unit 530 and also the body information supplied from the body information acquiring unit 510. The appliance authentication unit 520 supplies the authentication result for the electronic apparatus 200B electrically connected to the management apparatus 100B to the power supply control unit 540.

The authentication information storage unit 530 stores information which is necessary when the appliance authentication unit 520 carries out the authentication process for the electronic apparatus 200B. As one example, the authentication information storage unit 530 stores information capable of uniquely identifying an electronic apparatus 200B together with information showing whether the supplying of power to such electronic apparatus 200B is permitted. By storing such information, the authentication information storage unit 530 enables the appliance authentication unit 520 to carry out the authentication process for the electronic apparatus 200B that is electrically connected to the management apparatus 100B.

As the information necessary when the authentication process for the electronic apparatus 200B is carried out, the authentication information storage unit 530 stores information capable of uniquely identifying a user together with information showing whether the supplying of power to such electronic apparatus 200B is permitted when such user has connected the electronic apparatus 200B to the management apparatus 100B. By storing such information, the authentication information storage unit 530 enables the appliance authentication unit 520 to carry out the authentication process for the user attempting to use the electronic apparatus 200B electrically connected to the management apparatus 100B.

As the information necessary when the authentication process for the electronic apparatus 200B is carried out, the authentication information storage unit 530 may also include time information for supplying power to the electronic apparatus 200B. As one example, even when the same electronic apparatus 200B is used, if the user that has connected the electronic apparatus 200B to the management apparatus 100B differs, the time for which power is supplied to the electronic apparatus 200B may be set differently depending on the user. That is, the management apparatus 100B may supply unlimited power to the electronic apparatus 200B for a given user but supply power to the electronic apparatus 200B for only a specified time for a different user.

The power supply control unit 540 receives the authentication result produced by the appliance authentication unit 520 and controls the supplying of power to a terminal. If the result of authentication by the appliance authentication unit 520 is that the supplying of power to the electronic apparatus 200B electrically connected to the management apparatus 100B may start, the power supply control unit 540 carries out control so that power is supplied from the management apparatus 100B to the electronic apparatus 200B. Meanwhile, if the result of authentication by the appliance authentication unit 520 is that the supplying of power to the electronic apparatus 200B electrically connected to the management apparatus 100B is prohibited, the power supply control unit 540 carries out control so that power is not supplied from the management apparatus 100B to the electronic apparatus 200B.

This completes the description of the functional configuration of the control unit 106 with reference to FIG. 10. Next, an example configuration of a plug provided on the electronic apparatus 200B will be described.

Configuration of Plug

Figure 11:
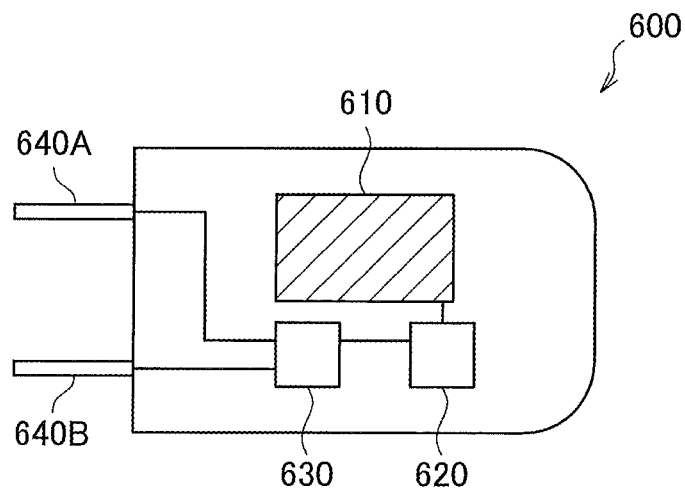
FIG. 11 is a diagram useful in explaining an example configuration of a plug 600 provided on the electronic apparatus 200B according to an embodiment of the present disclosure.

FIG. 11 is a diagram useful in explaining an example configuration of a plug 600 provided on the electronic apparatus 200B according to an embodiment of the present disclosure. An example configuration of the plug 600 will now be described with reference to FIG. 11.

As shown in FIG. 11, the plug 600 includes a fingerprint reading unit 610, a microprocessor 620, a communication interface 630, and electrodes 640A, 640B.

The fingerprint reading unit 610 reads a fingerprint of the user holding the plug 600. The fingerprint reading unit 610 supplies the read fingerprint as electronic data to the microprocessor 620.

The microprocessor 620 receives the electronic data obtained from the fingerprint of the user holding the plug 600 which was read by the fingerprint reading unit 610 and supplies the electronic data to the communication interface 630.

The communication interface 630 superimposes the electronic data received from the microprocessor 620 on information to be transmitted via a power line and transmits the data from the electrodes 640A, 640B to the management apparatus 100B. One example of the information to be transmitted via a power line is authentication information of the electronic apparatus 200B, and one example of such authentication information of the electronic apparatus 200B is appliance information for identifying the electronic apparatus 200B. Although it is desirable for the electronic data obtained from the fingerprint of the user to be transmitted at the same timing as the transmission of the authentication information of the electronic apparatus 200B, this is not a limitation for the present disclosure.

Figure 12:
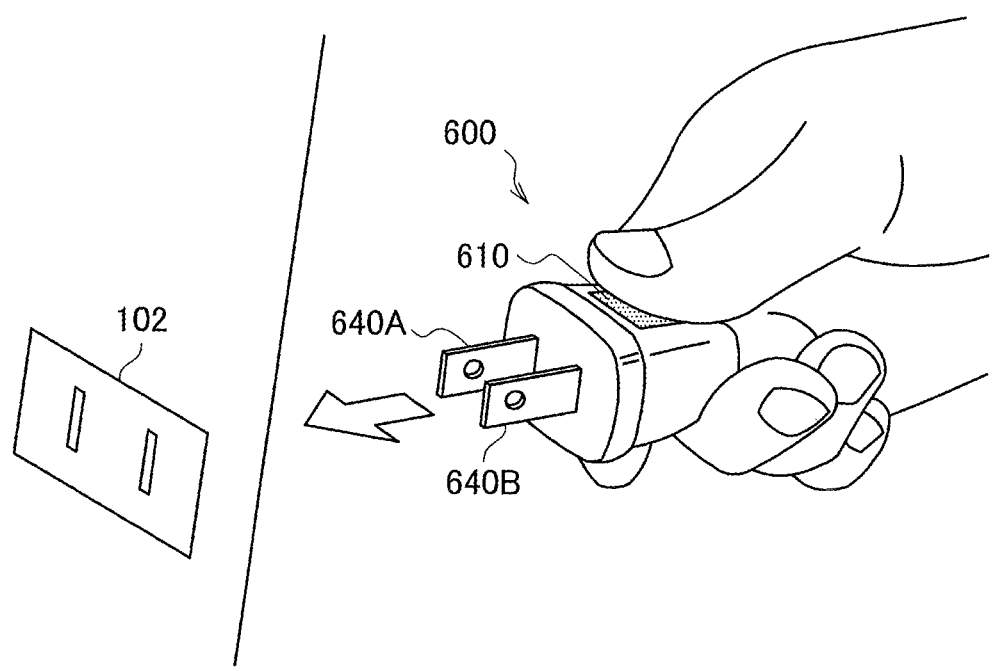
FIG. 12 is a diagram useful in explaining a state where a user is attempting to connect the plug 600 to the connecting unit 102.

FIG. 12 is a diagram useful in explaining a state where a user is attempting to connect the plug 600 to the connecting unit 102. As shown in FIG. 12, when attempting to connect the plug 600 to the connecting unit 102, the user has to hold the plug 600 with his/her fingers. The plug 600 uses this state of the user holding the plug 600 with his/her fingers to read a fingerprint using the fingerprint reading unit 610, generates electronic data from the read fingerprint, and superimposes the electronic data on information to be transmitted via the power line so as to transmit the electronic data from the electrodes 640A, 640B to the management apparatus 100B.

Note that although FIGS. 11 and 12 show a state where the fingerprint reading unit 610 is provided on part of one side surface of the plug 600, the present disclosure is not limited to such example. When considering that the user may hold the plug 600 in a variety of postures, as one example the fingerprint reading unit 610 may be provided so as to surround an outer circumferential surface of the plug 600.

This completes the description of an example configuration of the plug 600 with reference to FIG. 11. Next, the operation of the management apparatus 100B and the electronic apparatus 200B according to an embodiment of the present disclosure will be described.

System Operation

FIG. 13 is a flowchart showing the operation of the management apparatus 100B and the electronic apparatus 200B according to an embodiment of the present disclosure. The flowchart in FIG. 13 shows the operation for a case where the electronic apparatus 200B is electrically connected to the management apparatus 100B. The operation of the management apparatus 100B and the electronic apparatus 200B according to the present embodiment will now be described with reference to FIG. 13.

When electrically connecting the management apparatus 100B and the electronic apparatus 200B, as described earlier the user holds the plug 600 with his/her fingers and connects the plug 600 to the connecting unit 102. The electronic apparatus 200B acquires body information for the user holding the plug 600 (step S101). In the present embodiment, the fingerprint reading unit 610 provided on the plug 600 acquires fingerprint information for the user holding the plug 600 as the body information.

It should be obvious that the body information acquired by the electronic apparatus 200B is not limited to this example. Aside from a fingerprint, the vein pattern of the user's finger or a plethysmogram of the finger may be acquired as examples of the body information.

Once the body information of the user holding the plug 600 has been acquired by the electronic apparatus 200B in step S101 described above, the electronic apparatus 200B then superimposes the acquired body information on the power line to transmit the body information to the management apparatus 100B (step S102). The information transmitted from the electronic apparatus 200B to the management apparatus 100B on the power line includes appliance information for authenticating the electronic apparatus 200B. The electronic apparatus 200B transmits body information on the user holding the plug 600 as electronic data together with the appliance information of the electronic apparatus 200B for authenticating the electronic apparatus 200B to the management apparatus 100B.

When the electronic apparatus 200B transmits information to the management apparatus 100B on the power line in step S102 described above, the management apparatus 100B receives the information including the body information transmitted from the electronic apparatus 200B (step S103).

In step S103 described above, once the management apparatus 100B has received information including the body information transmitted from the electronic apparatus 200B, the management apparatus 100B then uses the appliance information of the electronic apparatus 200B and body information of the user holding the plug 600 transmitted from the electronic apparatus 200B to carry out authentication of the electronic apparatus 200B that is electrically connected (step S104).

Once, in step S104 described above, the management apparatus 100B has carried out authentication of the electrically connected electronic apparatus 200B, the management apparatus 100B then judges, according to such authentication, whether the supplying of power to the electronic apparatus 200B is permitted (step S105).

If, as a result of the judgment in step S105 described above, the supplying of power to the electronic apparatus 200B is permitted according to the authentication, the management apparatus 100B starts supplying power to the electronic apparatus 200B that is electrically connected (step S106). Meanwhile, if, as a result of the judgment in step S105 described above, the supplying of power to the electronic apparatus 200B is not permitted according to the authentication, the management apparatus 100B prohibits the supplying of power to the electronic apparatus 200B that is electrically connected (step S107).

Once the management apparatus 100B has started supplying power to the electronic apparatus 200B in step S106 described above, the electronic apparatus 200B receives the power supplied from the management apparatus 100B (step S108).

On receiving the power supplied from the management apparatus 100B in step S108 described above, the electronic apparatus 200B starts operating using the received power (step S109).

When electrically connected to the management apparatus 100B, the electronic apparatus 200B transmits appliance information of the electronic apparatus 200B to the management apparatus 100B and also transmits fingerprint information of the user who held the plug 600 to the management apparatus 100B. The management apparatus 100B then uses the appliance information of the electronic apparatus 200B and the fingerprint information of the user who held the plug 600 transmitted from the electrically connected electronic apparatus 200B to carry out an authentication process for the electronic apparatus 200B.

By carrying out the authentication process for the electronic apparatus 200B using the appliance information of the electronic apparatus 200B and the fingerprint information of the user who held the plug 600, the management apparatus 100B is capable of carrying out a precise authentication process not just for the appliance information of the electronic apparatus 200B but also for the user who is attempting to use the electronic apparatus 200B. Accordingly, even when the same electronic apparatus 200B has been electrically connected, if the user attempting to use such electronic apparatus 200B is different, the management apparatus 100B is capable of precise control of the supplying of power such as by prohibiting the supplying of power to the electronic apparatus 200B or limiting the time for which power is supplied to the electronic apparatus 200B depending on the user.

When limiting the time for which power is supplied to the electronic apparatus 200B, although the management apparatus 100B may suddenly stop the supplying of power to the electronic apparatus 200B when a specified time has been reached, some apparatuses, such as personal computers, can have problems if the supplying of power is suddenly cut off. For such apparatuses, before actually stopping the supplying of power, the management apparatus 100B may transmit information indicating that the supplying of power to the electronic apparatus 200B will stop. By configuring the electronic apparatus 200B so as to automatically power down on receiving the information indicating a stopping of the supplying of power, it will be possible for the electronic apparatus 200B to power down with no problems even if the supplying of power from the management apparatus 100B is thereafter suddenly cut off. Alternatively, before actually stopping the supplying of power, the management apparatus 100B may transmit information in which a procedure for powering down is written to the electronic apparatus 200B. By configuring the electronic apparatus 200B so as to power down in accordance with a procedure for powering down on receiving information in which such procedure is written, it will be possible for the electronic apparatus 200B to power down with no problems even if the supplying of power from the management apparatus 100B is thereafter suddenly cut off.

2. CONCLUSION

As described above, according to the present embodiment, communication is carried out between a management apparatus 100 and an electronic apparatus 200 via a power line. By communicating with an electronic apparatus 200 via a power line in the same way as in existing technology, the management apparatus 100 acquires identification information from the electronic apparatus 200 and specifies the electronic apparatus 200 connected via the power line based on the acquired identification information. Here, the electronic apparatus 200 obtains and is driven by power from a high-frequency signal transmitted superimposed on a power line by the management apparatus 100 and sends a reply by carrying out load modulation. Accordingly, even if an electronic apparatus 200 to which power is not being supplied is present among electronic apparatuses 200 that are connected by power lines, the management apparatus 100 will still be able to recognize such electronic apparatus 200. Accordingly, it is possible to specify an electronic apparatus 200 connected by a power line more reliably than with an existing technology that can recognize electronic apparatuses that are connected by power lines only when power is being supplied to such apparatuses.

Since an electronic apparatus 200 is driven by power obtained from a high-frequency signal transmitted superimposed by the management apparatus 100 on a power line and sends a reply by carrying out load modulation, the electronic apparatus 200 does not have to include a separate power supply circuit relating to communication via a power line. The electronic apparatus 200 is also capable of using a communication device with the same configuration as a communication device used in a communication technology conducted via NFC and/or a wireless communication technology such as RFID technology to realize communication via a power line with a management apparatus 100. Accordingly, compared to a case where an existing technology that carries out communication using existing PLC is used, it is easier to miniaturize the devices relating to communication and to also reduce cost.

In addition, since communication via power lines according to the present embodiment is compatible with a communication technology conducted via NFC and/or a wireless communication technology such as RFID technology it is possible to use a communication collision prevention (or so-called "anti-collision") technology in such wireless communication technology. Accordingly, it is possible to prevent a situation that can occur with existing technology that carries out communication using existing PLC whereby it is not possible to specify an electronic apparatus 200 even though power has previously been supplied to the electronic apparatus 200 connected via a power line.

Accordingly, by including the management apparatus 100 according to the present embodiment and the electronic apparatus 200 according to the present embodiment, it is possible to realize a system capable of specifying electronic apparatuses connected by power lines.

According to the present embodiment, when an electronic apparatus 200 is electrically connected to a management apparatus 100, aside from information specifying the electronic apparatus 200, information specifying the user attempting to use the electronic apparatus 200 is transmitted from the electronic apparatus 200 to the management apparatus 100. The management apparatus 100 carries out an authentication process for the electronic apparatus 200 based on the information received from the electronic apparatus 200. Due to the management apparatus 100 carrying out such authentication process, even when the same electronic apparatus 200B is electrically connected to the management apparatus 100, if the user attempting to use such electronic apparatus 200B is different, the management apparatus 100 is capable of precise control of the supplying of power such as by prohibiting the supplying of power to the electronic apparatus 200B or limiting the time for which power is supplied to the electronic apparatus 200B depending on the user.

A program that causes a computer to function as a management apparatus according to the present embodiment (for example, a program that causes a computer to function as a management unit according to the present embodiment) is capable of specifying an electronic apparatus connected via a power line. Accordingly, by using a program for causing a computer to function as a management apparatus according to the present embodiment, it is possible to realize a management system capable of specifying an electronic apparatus connected via a power line.

A program for causing a computer to function as an electronic apparatus according to the present embodiment (for example, a program that causes a computer to function as an apparatus-side power line communication unit according to the present embodiment) is capable of carrying out communication with a management apparatus according to the present embodiment via a power line. Accordingly, by using a program for causing a computer to function as an electronic apparatus according to the present embodiment, it is possible to realize a management system capable of specifying an electronic apparatus connected via a power line.

The embodiment of the present disclosure is not limited to the above-described embodiment. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A transmission apparatus including:
a terminal electrically connected to a terminal of another apparatus;
a body information acquiring unit acquiring body information of a user holding the transmission apparatus; and
a transmission unit operable, by carrying out load modulation in accordance with the terminal contacting or being positioned close to the terminal of the other apparatus, to transmit, via the terminal, information on which the body information acquired by the body information acquiring unit is superimposed.

(2) An electronic appliance including:
the transmission apparatus according to (1).

(3) A reception apparatus including:
a terminal electrically connected to a terminal of another apparatus; and a reception unit operable, when the terminal contacts or is positioned close to the terminal of the other apparatus, to receive information on which body information acquired by the other apparatus is superimposed and which has been transmitted from the other apparatus by load modulation.

(4) The reception apparatus according to (3), further including:
an authentication unit authenticating a user using the other apparatus by using the body information superimposed on the information received by the reception unit.

(5) The reception apparatus according to (4), further including:
a power supply control unit deciding whether supplying of power to the other apparatus is permitted in accordance with an authentication result of the authentication unit.

(6) The reception apparatus according to (5),
wherein the authentication unit is operable, even when information is received from a same apparatus, to decide whether the supplying of the power to the other apparatus is permitted in accordance with the body information.

(7) The reception apparatus according to (5) or (6),
wherein the power supply control unit performs control in a manner that the power is supplied to the other apparatus for only a predetermined time in accordance with the authentication result of the authentication unit.

(8) The reception apparatus according to any one of (5) to (7),
wherein the power supply control unit transfers, to the other apparatus, information regarding a procedure for when the other apparatus is turned off in accordance with the authentication result of the authentication unit.

(9) An authentication system including:
a transmission apparatus; and
a reception apparatus,
wherein the transmission apparatus includes
a terminal electrically connected to a terminal of the reception apparatus,
a body information acquiring unit acquiring body information of a user holding the transmission apparatus, and
a transmission unit operable, by carrying out load modulation in accordance with the terminal contacting or being positioned close to the terminal of the reception apparatus, to transmit, to the reception apparatus via the terminal, information on which the body information acquired by the body information acquiring unit is superimposed, and
wherein the reception apparatus includes
a terminal electrically connected to the terminal of the transmission apparatus, and
a reception unit operable, when the terminal contacts or is positioned close to the terminal of the transmission apparatus, to receive information on which body information acquired by the transmission apparatus is superimposed and which has been transmitted from the transmission apparatus by load modulation.

(10) A computer program for causing a computer to realize:
a body information acquiring unit acquiring body information of a user holding an apparatus; and
a transmission unit operable, by carrying out load modulation in accordance with a terminal electrically connected to a terminal of another apparatus contacting or being positioned close to the terminal of the other apparatus, to transmit, via the terminal, information on which the body information acquired by the body information acquiring unit is superimposed.

(11) A computer program for causing a computer to realize:
a reception unit operable, when a terminal electrically connected to a terminal of another apparatus contacts or is positioned close to the terminal of the other apparatus, to receive information on which body information acquired by the other apparatus is superimposed and which has been transmitted from the other apparatus by load modulation.

The present disclosure contains subject matter related to that disclosed in Japanese Priority Patent Application JP 2012-028647 filed in the Japan Patent Office on Feb. 13, 2012, the entire content of which is hereby incorporated by reference.

What is claimed is:

1. A transmission apparatus comprising:
a first terminal configured to be electrically connectable to a terminal of another apparatus;
a body information acquiring unit configured to read body information of a user holding the transmission apparatus from a body of the user, wherein the body information uniquely identifies the user;
a transmission unit configured to transmit, via the first terminal by carrying out load modulation in response to the first terminal contacting or being positioned close to the terminal of the other apparatus, information on which the body information read by the body information acquiring unit and appliance information of the transmission apparatus is superimposed; and
a power line to receive power from the other apparatus in accordance with the transmitted information.

2. An electronic appliance comprising:
a transmission apparatus comprising:
a first terminal configured to be electrically connectable to a terminal of another apparatus;
a body information acquiring unit configured to read body information of a user holding the transmission apparatus from a body of the user, wherein the body information uniquely identifies the user;
a transmission unit configured to transmit, via the first terminal by carrying out load modulation in response to the first terminal contacting or being positioned close to the terminal of the other apparatus, information on which the body information read by the body information acquiring unit and appliance information of the transmission apparatus is superimposed; and
a power line to receive power from the other apparatus in accordance with the transmitted information.

3. A reception apparatus comprising:
a first terminal configured to be electrically connectable to a terminal of another apparatus;
a reception unit configured to receive information on which body information read by the other apparatus and appliance information of the other apparatus is superimposed when the first terminal contacts or is positioned close to the terminal of the other apparatus, wherein the received information has been transmitted from the other apparatus by load modulation, wherein the body information uniquely identifies a user holding the other apparatus,
wherein the body information is read by the other apparatus from a body of the user; and
a power supply control unit configured to supply power to the other apparatus in accordance with the received information.

4. The reception apparatus according to claim 3, further comprising:
an authentication unit authenticating the user using the other apparatus by using the body information superimposed on the information received by the reception unit.

5. The reception apparatus according to claim 4,
wherein the power supply control unit decides whether the supplying of the power to the other apparatus is permitted in accordance with an authentication result of the authentication unit.

6. The reception apparatus according to claim 5,
wherein the authentication unit is operable, even when information is received from a same apparatus, to decide whether the supplying of the power to the other apparatus is permitted in accordance with the body information.

7. The reception apparatus according to claim 5,
wherein the power supply control unit performs control in a manner that the power is supplied to the other apparatus for only a predetermined time in accordance with the authentication result of the authentication unit.

8. The reception apparatus according to claim 5,
wherein the power supply control unit transfers, to the other apparatus, information regarding a procedure for when the other apparatus is turned off in accordance with the authentication result of the authentication unit.

9. An authentication system comprising:
a transmission apparatus; and
a reception apparatus,
wherein the transmission apparatus includes:
   a first terminal electrically connected to a second terminal of the reception apparatus,
   a body information acquiring unit configured to read body information of a user holding the transmission apparatus from a body of the user, wherein the body information uniquely identifies the user,
   a transmission unit configured to transmit, via the first terminal by carrying out load modulation in response to the first terminal contacting or being positioned close to the second terminal of the reception apparatus, information on which the body information read by the body information acquiring unit and appliance information of the transmission apparatus is superimposed, and
   a power line to receive power from the reception apparatus in accordance with the transmitted information, and
wherein the reception apparatus includes:
   the second terminal electrically connected to the first terminal of the transmission apparatus,
   a reception unit configured to receive information on which the body information read by the transmission apparatus and appliance information of the transmission apparatus is superimposed and which has been transmitted from the transmission apparatus by load modulation, and
   a power supply control unit configured to supply the power to the transmission apparatus.

10. A non-transitory computer storage medium having stored thereon, a set of computer executable instructions for causing a computer to realize:
   a body information acquiring unit configured to read body information of a user holding an apparatus from a body of the user, wherein the body information uniquely identifies the user; and
   a transmission unit configured to transmit, via a first terminal by carrying out load modulation in response to the first terminal being electrically connected to a terminal of another apparatus by contacting or being positioned close to the terminal of the other apparatus, information on which the body information read by the body information acquiring unit and appliance information of the apparatus is superimposed, wherein
   a power line of the apparatus receives power from the other apparatus in accordance with the transmitted information.

11. A non-transitory computer storage medium having stored thereon, a set of computer executable instructions for causing a computer to realize:
   a reception unit configured to receive information on which body information read by another apparatus and appliance information of the other apparatus is superimposed when a first terminal is electrically connected to a terminal of the other apparatus contacts or is positioned close to the terminal of the other apparatus,
   wherein the received information has been transmitted from the other apparatus by load modulation,
   wherein the body information uniquely identifies a user holding the other apparatus,
   wherein the body information is read by the other apparatus from a body of the user; and
   a power supply control unit configured to supply power to the other apparatus in accordance with the received information.

12. The transmission apparatus according to claim 1, further comprising a finger print reading unit configured to read the body information, wherein the read body information is a finger print of a finger of the user.

13. The transmission apparatus according to claim 1, wherein the read body information of the user comprises a vein pattern of a finger of the user.

14. The transmission apparatus according to claim 1, wherein the read body information of the user comprises a plethysmogram of a finger of the user.

15. The transmission apparatus according to claim 1, wherein the transmission apparatus is authenticated based on the body information of the user and the appliance information.

16. The transmission apparatus according to claim 15, wherein the transmission apparatus receives the power based on the authentication of the transmission apparatus.

17. The reception apparatus according to claim 3, further comprising a connecting unit configured to detect change in states of electrical connection between the first terminal and the terminal of the other apparatus and transmit a corresponding detection signal.

18. The reception apparatus according to claim 17, further comprising a control unit configured to receive the detection signal from the connecting unit and transmit a transmission request to the other apparatus, for the transmission of the body information of the user, in accordance with the detection signal.

* * * * *